Aug. 11, 1964     E. R. DAVIES ETAL     3,144,107
MULTIPLE SPEED TRANSMISSION
Filed July 25, 1955     7 Sheets-Sheet 1

INVENTORS:
EDWARD R. DAVIES,
GLENN L. BOWEN &
ROBERT W. LEMON.
By
ATTORNEY.

Aug. 11, 1964 E. R. DAVIES ETAL 3,144,107
MULTIPLE SPEED TRANSMISSION
Filed July 25, 1955 7 Sheets-Sheet 3

INVENTORS:
EDWARD R. DAVIES,
GLENN L. BOWEN &
ROBERT W. LEMON.
BY
ATTORNEY.

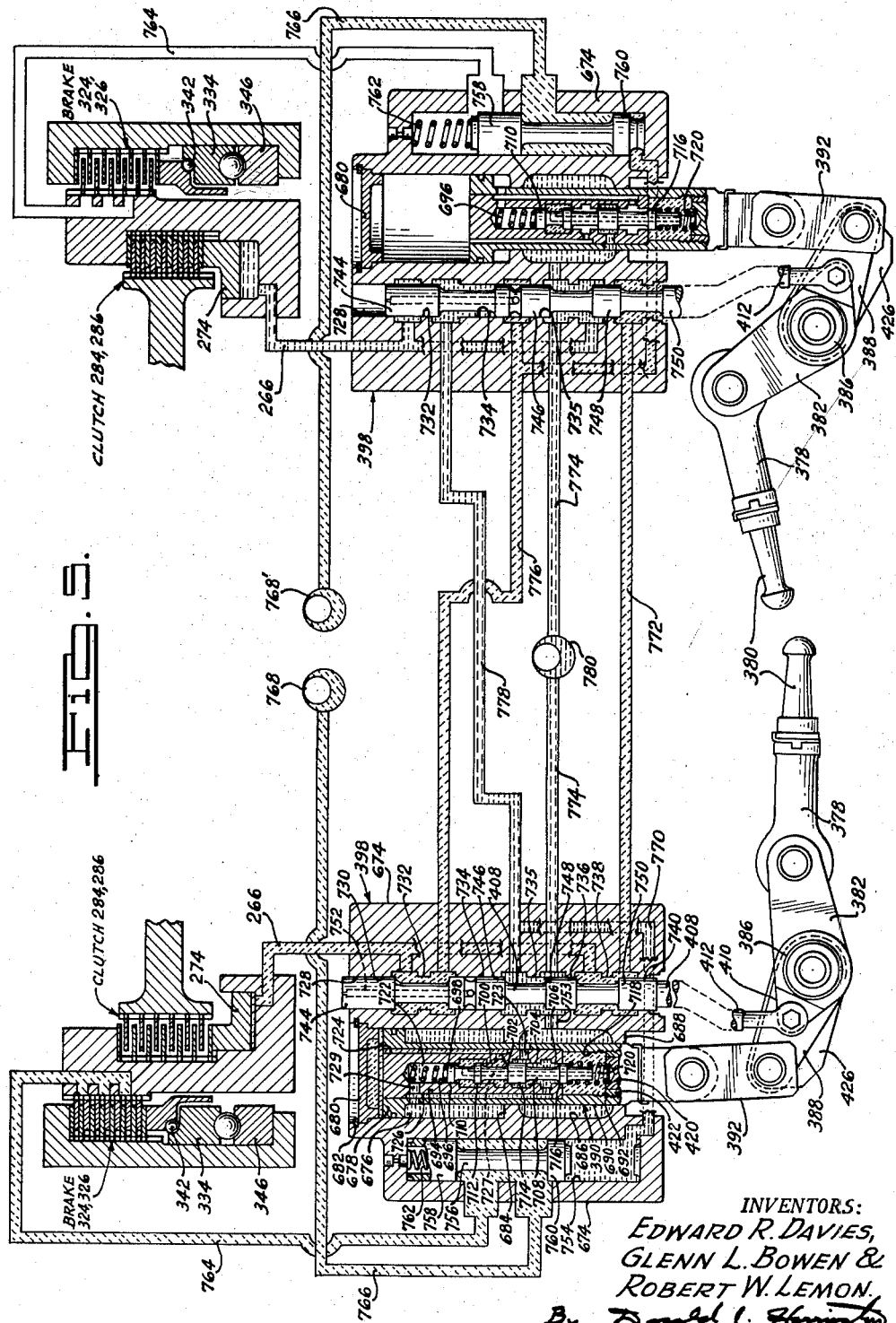

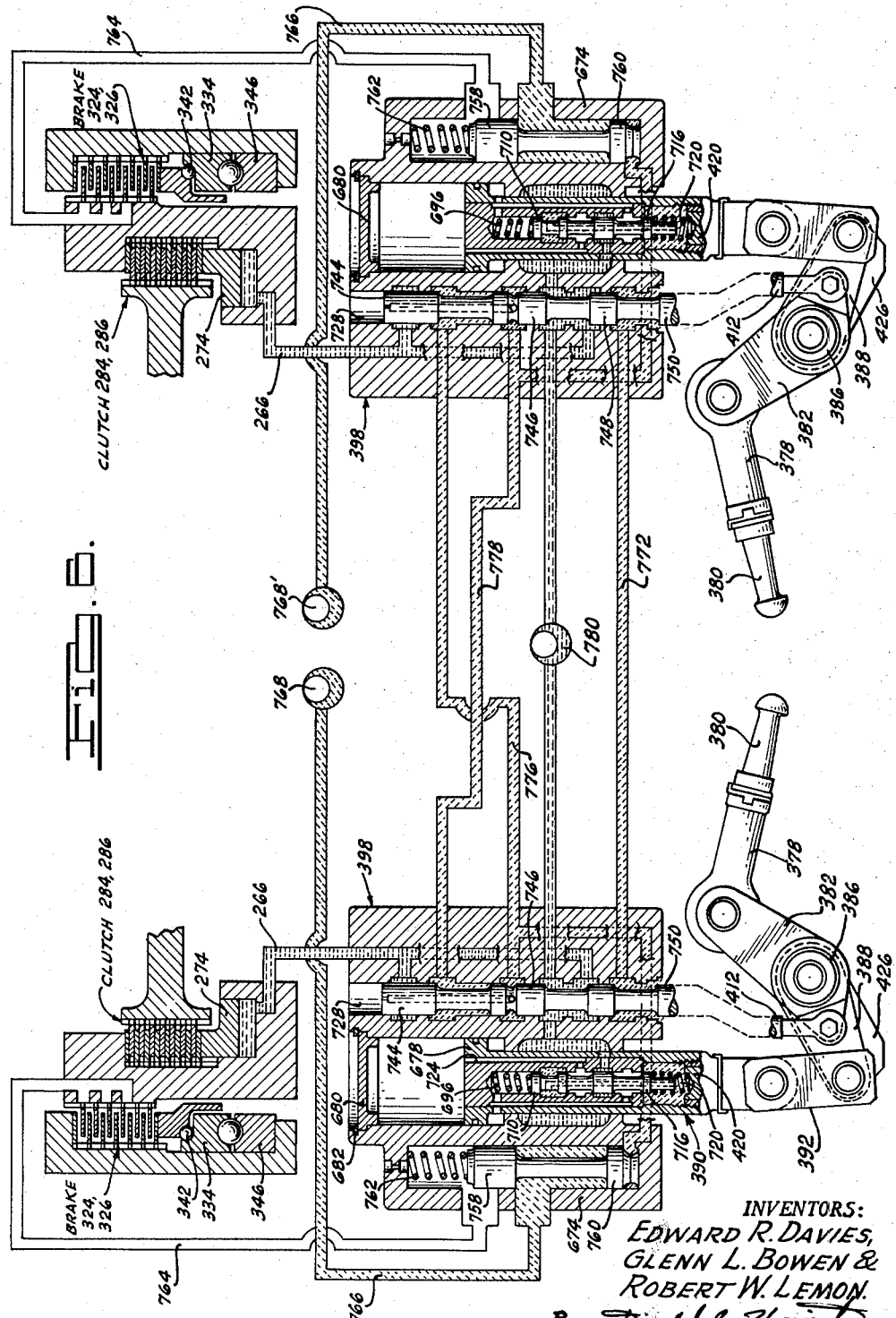

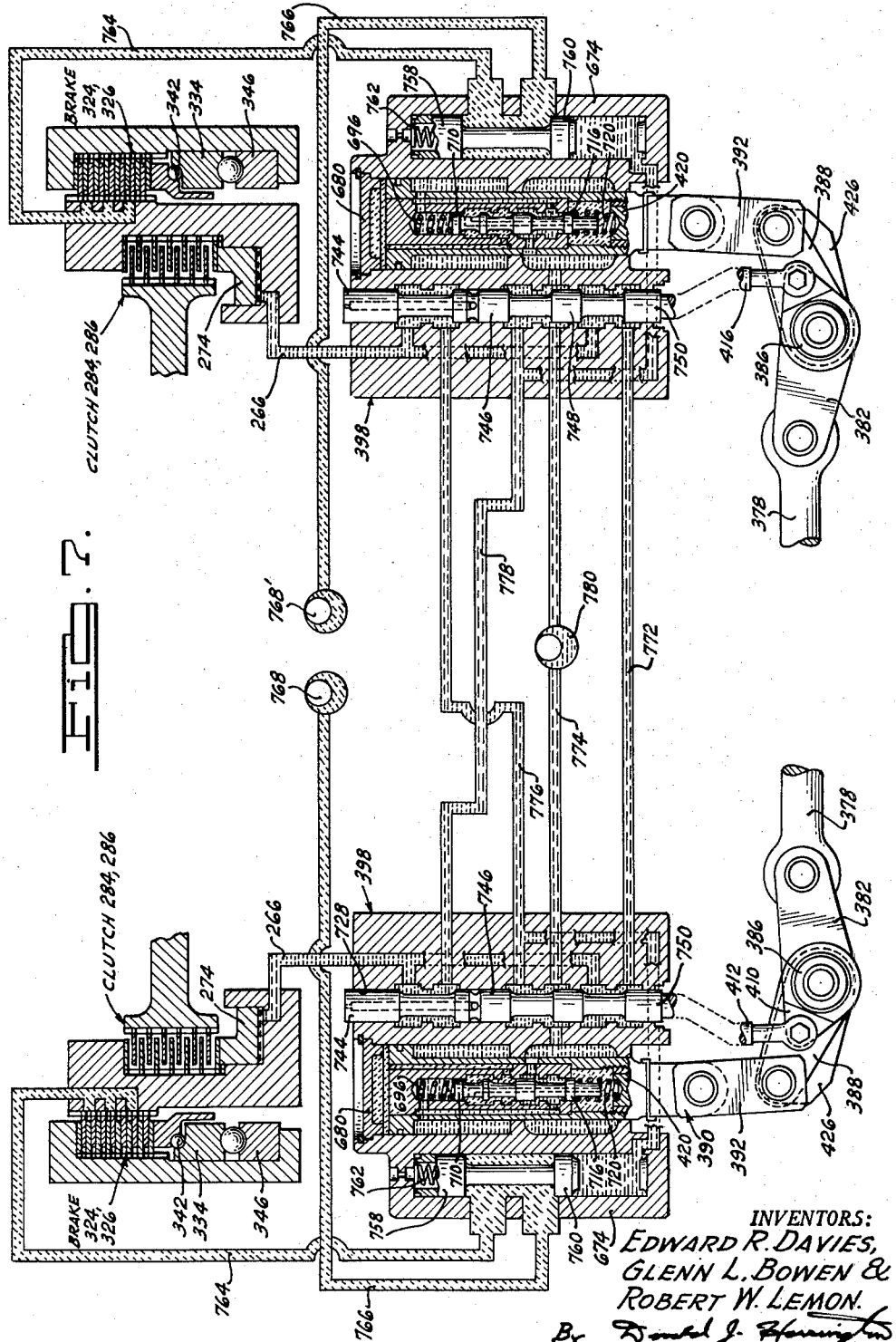

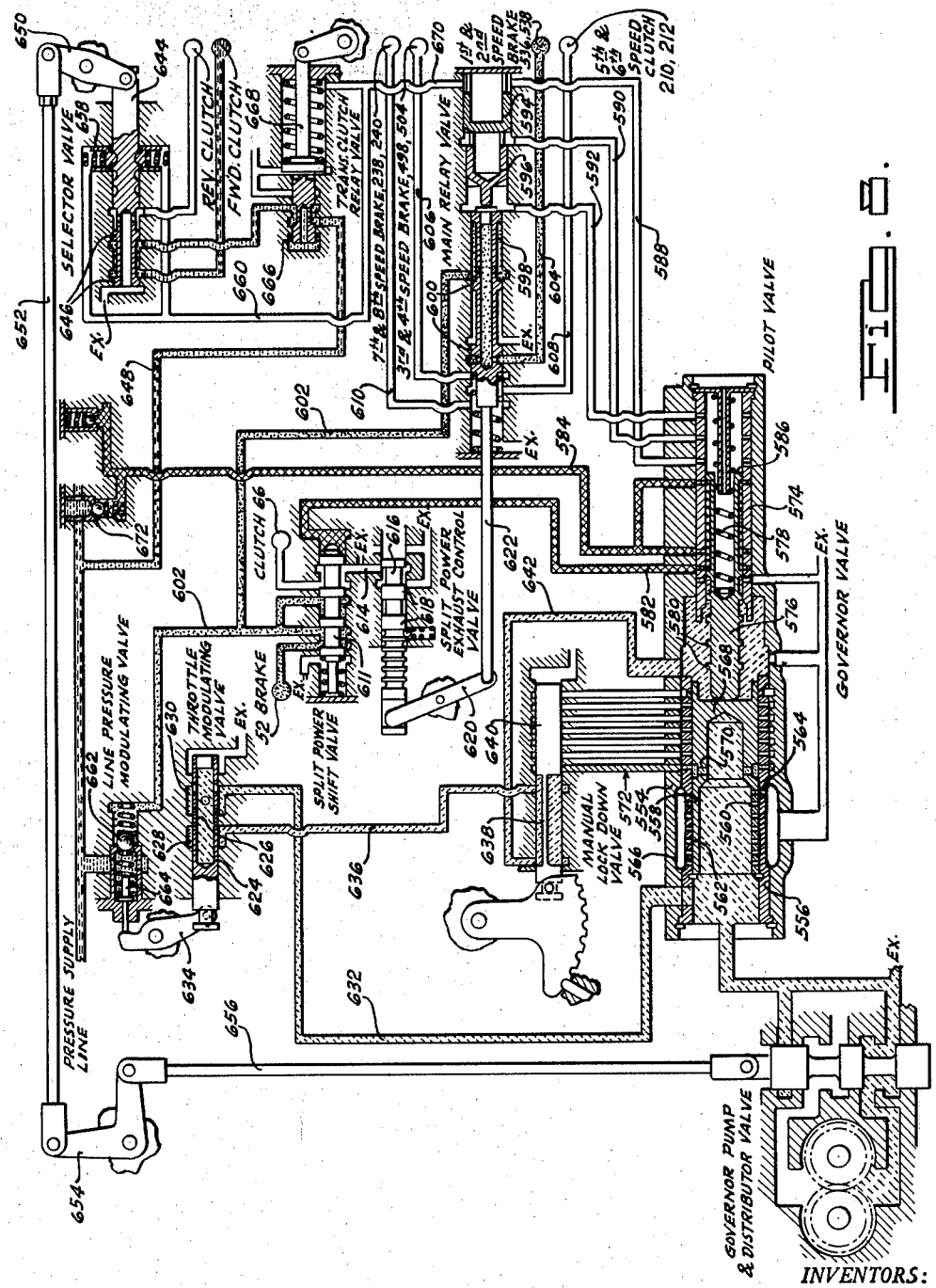

United States Patent Office 3,144,107
Patented Aug. 11, 1964

3,144,107
MULTIPLE SPEED TRANSMISSION
Edward R. Davies, Oak Park, and Glenn L. Bowen and Robert W. Lemon, Detroit, Mich., assignors to Jered Industries, Inc., Hazel Park, Mich., a corporation of Michigan
Filed July 25, 1955, Ser. No. 524,188
23 Claims. (Cl. 192—13)

Our invention relates generally to power transmitting mechanisms and more particularly to a new and improved variable speed transmission which is especially adapted to be used with heavy wheeled or tracked vehicles and power equipment or the like, but which is also capable of many other uses.

Our invention as presently disclosed includes improvements in the multiple speed transmission disclosed in our copending application Serial No. 397,297, now Patent No. 2,974,545, which is assigned to the assignee of our present invention.

The transmission of the above-identified copending application comprises a multiple speed gear reduction unit having a plurality of planetary gearsets which are operatively associated in a unique and composite arrangement and which are adapted to selectively provide a series of gear ratios, the values of the various ratios in the series being uniformly and substantially evenly spaced. More specifically, the transmission includes two pairs of planetary gearsets which are concentrically disposed about a power output shaft at spaced locations thereon, the planetary gearsets of each pair being compounded. The two sun gears for each pair of planetary gearsets are integrally assembled on common shaft members, the sun gears of one pair being clutched to a power input source and the sun gears of the other pair being splined to the output shaft.

The carrier for a first gearset of the above-mentioned one pair is operatively connected to the ring gear of the second gearset thereof and the carrier for this second gearset is connected to the power output shaft. Brake means are provided for selectively braking either of the ring gears of the one pair of gearsets.

The sun gears for the one pair of planetary gearsets are joined to the carrier of a first of the other pair of gearsets by means of a hollow sleeve concentrically disposed about the output shaft between the spaced pairs of compounded planetary gears. The ring gear for the first of the other pairs of gearsets is operatively connected to the carrier of the second gearset thereof. Means are provided for selectively braking the ring gear of this second gearset and for clutching the same to the power output shaft.

The power input source for the above-described compounded planetary gearsets includes an input driving shaft having its axis disposed perpendicularly to the axis of the power output shaft, said input and output shafts being drivably connected by means of a suitable right angle drive. The input shaft is splined to the carrier assembly of a simple planetary gear unit which will hereinafter be referred to as the "split power unit." The ring gear of the "split power unit" is adapted to receive power from any suitable power source. Means are provided for selectively and alternately clutching the sun gear of the "split power unit" to the carrier and input shaft thereof and for braking the "split power" sun gear to the transmission casing.

Suitable automatic control means may be provided for selectively clutching and braking the component elements of the four compounded planetary gearsets and for alternately clutching and braking the sun gear of the "split power unit" to the carrier and to the transmission casing, respectively, as pointed out above.

The clutches and brakes for the four compounded planetary gearsets may be individually energized in an operative sequence, and as each clutch or brake is so energized, either of two speed reduction ratios may be obtained between the input and output members by alternately clutching and braking the sun gear of the "split power unit." Thus, the "split power unit" is effective to double the number of speeds which might ordinarily be obtained by means of the four compounded planetary gearsets acting alone.

The above-described transmission structure has been disclosed and claimed in our above-mentioned copending application Serial No. 397,297 and the principal components thereof have corresponding components in the transmission of our present invention. The improvement of our instant invention resides principally in a new and advantageous means for controlling the power which is delivered by the compounded planetary gearsets from the power source to the power output shaft before it is transferred to the driven or power absorbing means.

When the improved transmission of our instant invention is employed with wheeled or tracked vehicles, the driving wheels or sprockets, as appropriate, may constitute the above-mentioned power absorbing means.

According to a principal feature of our instant invention, the individual driving wheels or sprockets may be selectively clutched to the power output shaft or braked to the transmission casing thereby providing a means for controlling directional variations of the vehicle during operation. Additionally, the vehicle driving wheels or sprockets may be simultaneously braked to stop the movement of the vehicle as desired.

The provision of a new and improved multiple speed power transmission as briefly outlined above being a principal object of our instant invention, another object of our invention is to provide a multiple speed transmission having a power input driving member, a power output driven member, a multiple speed gear means drivably connecting said driving and driven members, and clutch and brake means for selectively clutching a power absorbing means to said driven member and for braking said driven member to the transmission housing.

A further object of our present invention is to provide a multiple speed power transmission for use with tracked or wheeled vehicles, said transmission including a driven power output shaft and means for clutching said driven shaft to a spaced pair of driving traction wheels or sprockets.

A further object of our present invention is to provide a multiple speed power transmission as set forth in the preceding object wherein means are included for selectively braking either or both of said traction wheels or sprockets to the transmission casing.

Another object of our instant invention is to provide a multiple speed power transmission for use with a wheeled or tracked vehicle, said transmission including a driven cross shaft adapted to be selectively clutched at either or both ends thereof to a spaced pair of vehicle driving wheels or sprockets, and wherein means are provided for selectively braking either of said driving wheels or sprockets to the transmission casing, the clutch and brake means associated with each driving wheel or sprocket being effective to control the driving speeds of the driving wheel or sprocket relative to the cross shaft.

Another object of our instant invention is to provide a multiple speed power transmission for use with a wheeled or tracked vehicle wherein the driving wheels or sprockets of the latter are drivably connected to a driven portion of the transmission and wherein the relative driving speeds of the driving wheels or sprockets may be varied as desired to effect turning maneuvers of the vehicle with turning radii of a variety of different magnitudes.

A further object of our instant invention is to provide a new and improved control means for selectively energizing the individual clutches and brakes associated with the vehicle driving wheels or sprockets as above described.

A further object of our instant invention is to provide a new and improved control means as set forth in the preceding object wherein a power boosting mechanism is provided for supplementing a manual braking effort which may be applied to the braking means associated with each driving wheel or sprocket, as above set forth, and wherein the total braking effort applied to the same is proportional to the magnitude of the manual effort applied thereto.

A further object of our instant invention is to provide a steering control as set forth in the preceding object wherein means are included for automatically deenergizing the clutch means associated with the individual driving wheels or sprockets as a braking effort is applied thereto, and for automatically energizing said clutch means as the braking effort is relieved.

A further object of our present invention is to provide a control means as set forth in the preceding objects wherein an alternative manually operable means is provided for actuating the brake means associated with each driving wheel or sprocket, said manually operable means being adapted to be used in lieu of the above-described automatic braking means when the latter fails to function.

It is a further object of our instant invention to provide a multiple speed power transmission for powering the driving wheels or sprockets of a vehicle, said transmission including a driven member and means for drivably connecting the same to each of a spaced pair of said driving wheels or sprockets, wherein clutch and brake means are provided for varying the relative driving speeds of said driving wheels and sprockets to accomplish turning maneuvers of the vehicle and wherein the individual components and subassemblies of the transmission structure are simple and compact in construction.

A further object of our present invention is to provide a new and improved means for controlling the clutch and brake means of the transmission structure set forth in the preceding object, said control means being simple in construction and operation.

Other objects of the invention will readily become apparent from the following description of the structure of our instant invention.

In carrying forth the foregoing objects, we have provided a transmission mechanism of the type briefly described above, in which the transmission power output shaft may be connected at either end thereof to either of two power takeoff flanges which in turn may be drivably connected to the driving wheels or sprockets of the vehicle.

In the transmission structure of our above-mentioned copending application, the power output shaft is positively splined to the power output flanges so that the output power is equally distributed between the two flanges, each flange being driven at the same rate of speed. By way of contrast, the power output flanges of our instant transmission structure are adapted to be rotatably mounted at either axial end of the power output shaft to accommodate a relative rotary movement thereof with respect to the power output shaft. Individual power output clutch means and brake means are disposed adjacent each power output flange for selectively clutching the individual flanges to the power output shaft or for braking the same to the transmission housing.

A unique automatic control mechanism is provided for energizing each of the respective clutches and brakes as desired during the operation of the vehicle. This control means is operative to energize either or both of the power output clutch means so that power may be distributed to either one or both of the vehicle driving wheels or sprockets. Likewise, either one or both of the individual power output brake means may be energized so that either or both of the driving wheels or sprockets may be wholly or partially braked. Means are provided for preventing the simultaneous actuation of both the clutch means and the brake means associated with any one power output flange, but simultaneous actuation of either the clutch or the brake means associated with one power output flange and either the clutch or the brake means associated with the other power output flange may be obtained. These individual clutch and brake means will each hereinafter be referred to as steering clutches and brakes. The use of the steering clutches and brakes at either axial end of the transmission power output shaft makes possible a controlled directional variation of the vehicle with which the transmission is used thereby greatly improving maneuverability. The controlled steering and braking features of our instant structure eliminate the need for using auxiliary two speed reduction gear boxes in combination with the multiple speed gear elements of the main transmission unit thereby considerably simplifying the overall vehicle power drive train and reducing the space requirements of the same.

The steering clutch means are fluid pressure actuated and the steering brake means are actuated mechanically. The brake means are of the multiple disc type and pressure may be applied to the multiple discs thereof by means of a movable cam element. A lever mechanism is provided for moving the brake cam element to effect a braking action of the steering brakes, said lever mechanism being loosely splined to a manually operable shaft thereby providing a lost motion connection therebetween. The manually operable shaft is accessible to the vehicle operator and is connected to the piston structure of a power boosting fluid motor or servo.

A servo valve means is centrally disposed within the servo piston structure and it includes a movable valve element which is spring biased toward a central, neutral position. As the manually operable shaft is moved by the vehicle operator, an unbalanced axial spring force is exerted on the valve element thereby shifting the same with respect to the piston structure from its neutral position. This valve movement causes pressurized fluid from a pressurized control conduit to enter a fluid working chamber on one side of the piston structure thereby causing the piston structure to follow the movement of the movable valve element. This is accompanied by movement of the brake lever mechanism of the associated steering brake means.

As the fluid pressure in the working chamber of the brake servo increases, it is effective to actuate another pressure responsive valve device which causes cooling oil to circulate through the multiple discs of the energized steering brake means.

Another movable valve element may be connected to the brake lever mechanism of each of the steering brake means and as the latter are energized, as above described, this other valve element is effective to exhaust the pressurized fluid from the associated steering clutch means thereby preventing the steering clutch means and steering brake means for any one driving wheel or sprocket from being simultaneously actuated during turning maneuvers of the vehicle. One of these other valve elements is associated with each steering clutch and brake assembly and they are effective to cause the steering clutches to remain energized while braking the vehicle during forward or reverse operation. This latter feature makes it possible to utilize engine braking torque to halt the forward or reverse motion of the vehicle. The engine is thereby effective to supplement the braking effort of the multiple disc brakes.

Passage means are provided within the piston structure of each of the steering brake servos for causing working fluid to act on one end of the movable valve element thereof to oppose the spring force applied thereto by the manually operable steering shaft. Accordingly, a greater manual effort must be applied by the operator to obtain higher braking pressures, the magnitude of the total braking effort being substantially proportional to the magnitude of the manual effort applied by the vehicle operator to the manually operable steering shaft. This so-called "feel-back" feature provides the vehicle operator with a normal steering sensation to give better control and to provide safer operation.

If, for some reason, the hydraulic boosting portion of the individual steering brake means should fail to function, the brakes may be applied manually by virtue of the above-described lost motion connection between the manually operable brake shaft and the brake lever mechanism. The braking effort required by the operator is, in this instance, considerably greater than that normally required but it is sufficient to maintain control of the vehicle during operation. This feature permits the vehicle operator to stop the motion of the vehicle or to execute a turning maneuver during emergencies thereby providing an added margin of safety.

If the steering brake on one side of the vehicle is fully applied while the steering clutch on the other side of the vehicle is applied, the vehicle will pivot about the track on the one side of the vehicle. If the same steering brake is only partially applied, a relative sliding movement will be obtained between the brake discs of the steering brake and the radius of the turn will be greater than the minimum. The degree of the turn is therefore fully under the control of the vehicle operator, the larger the braking effort applied by the operator the smaller the turning radius will be.

For the purpose of more particularly describing one preferred embodiment of our instant invention, reference will be made to the accompanying drawings wherein.

Figure 1:
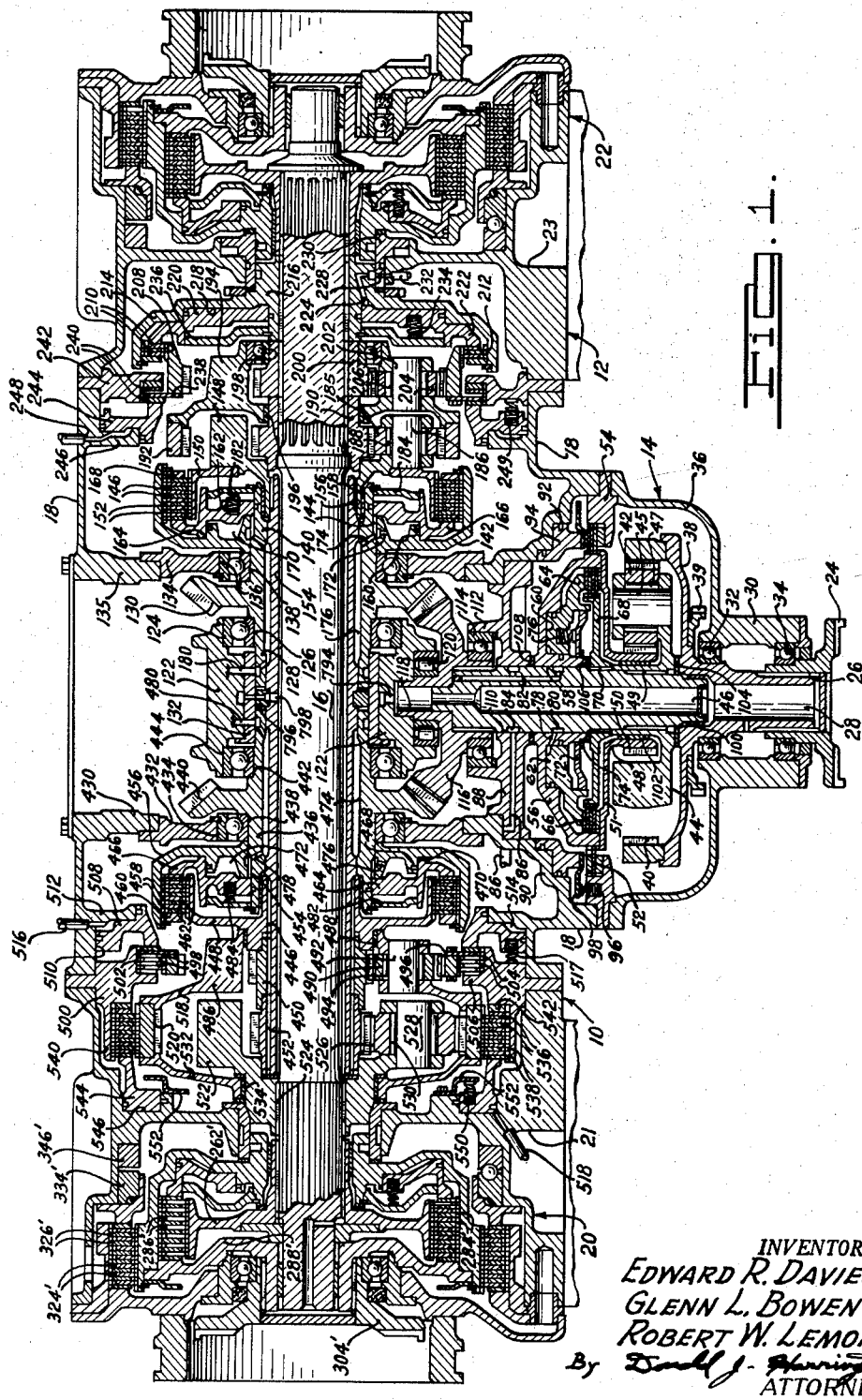
FIGURE 1 is a cross sectional view of the transmission assembly of our instant invention including the steering clutch and brake structure referred to above.

FIGURES 5, 6, and 7 are schematic assembly views of the control mechanism for the steering clutches and brakes of FIGURES 1 through 4, each view showing a different operating condition; and FIGURE 8 is a schematic drawing of the automatic control valve mechanism which is used for controlling the various planetary gear elements of the transmission of FIGURE 1 to obtain any one of several gear ratios in an operative sequence.

Referring first to the assembly view of FIGURE 1, the transmission structure comprises three principal planetary gear portions shown generally at 10, 12, and 14 respectively, the portion 14 being referred to herein as the "split power unit." Each of the gear portions 10 and 12 comprises compounded planetary gear elements which are concentrically disposed about a power output shaft 16 within a common cast housing 18. A steering clutch and brake assembly are situated at either axial side of the transmission housing 18 as generally indicated at 20 and 22, respectively. The cast housing structure associated with the steering clutch and brake assemblies 20 and 22 are designated by numerals 21 and 23, respectively. These housing portions 21 and 23 may be securely bolted at either axial side of the main transmission housing 18, as shown, to form a composite, cast housing assembly.

A power input flange 24 is secured by means of splines 26 to the end of a power input shaft 28 which may be journalled in a suitable housing member 30 by means of bearings 32 and 34. The housing member 30 includes a bell-shaped portion 36, the periphery of which may be bolted to the main cast housing 18 as shown.

The power input shaft 28 may form the hub of a planetary ring gear member 38 having internal ring gear teeth 40 which are adapted to drivably engage a plurality of planet gears 42. An accessory drive gear 39 may be secured to gear member 38 as shown. A carrier member 44 rotatably journals each of the planet gears 42 by means of bearing pin 45 which forms an inner race for needle bearings 47. The carrier member 44 is securely splined to a power shaft 46 as shown at 49. A sun gear member is shown at 48 and it includes a geared portion 50 which is in driving engagement with each of the planet gears 42. The sun gear member 48 further includes a radially extending plate portion 51 which carries one or more brake discs 52, the periphery of the outer edge of the plate portion 51 being splined to receive mating internal spline teeth formed on the inner periphery of the brake discs 52. One or more other brake discs 52 are splined at the outer periphery thereof to an adapter ring 54 which may be integrally secured to the housing 18, the discs 52 being alternately positioned in stacked adjacent relationship to form a multiple disc brake assembly.

A circular thrust member is shown at 56 and it is secured about the periphery thereof to the outer periphery of the disc portion 51 of the sun gear member 48. Thrust member 56 is provided with a central bearing aperture 58 through which the power shaft 46 is received, said thrust member 56 being rotatably supported by shaft 46. The side of member 56 defines an annular cavity or servo working chamber 60 within which an annular piston member 62 is slidably received. The piston member 62 includes a radially extending portion 64 which is adapted to contact and to energize a multiple disc clutch assembly 66.

Alternate ones of the clutch discs which comprise the clutch assembly 66 are splined to the inner peripheral edge of the thrust member 56 and the other clutch discs thereof are splined to the outer peripheral edge of a clutch member 68 which in turn is securely splined at 70 to the power shaft 46.

A spring backup plate is provided at 72 and is disposed about the power shaft 46. A suitable snap ring may be provided on the power shaft 46 as shown at 74 to prevent axial movement of the plate 72 upon shaft 46. A plurality of return springs 76 may be interposed between the plate 72 and the annular piston 62 for the purpose of biasing the latter in an upward direction, as viewed in FIGURE 1, to deenergize the clutch plate assembly 66.

The piston member 62 is effective to energize the clutch plate assembly 66 as high pressure fluid is admitted into the working chamber 60, the fluid pressure acting on the working face of piston 62. High pressure fluid is admitted to working chamber 60 through a passage 78 formed in thrust member 56, through a peripheral groove 80 formed about the shaft 46, through a passage 82 formed in shaft 46 and communicating with groove 80 at one end thereof and with another similar groove 84 at the other end thereof, and through a passage 86 formed in a transverse wall member 88, said wall member 88 being disposed across an extension 90 of the cast housing 18. A suitable fluid fitting, not shown, may be connected to the passage 86 for connecting the latter to a control valve mechanism later to be described.

The wall member 88 is formed with an annular recess 92 within which a mating annular piston member 94 is slidably received, the piston 94 being adapted to move in an axial direction. The opposed surfaces of the recess 92 and the movable piston member 94 define a fluid working chamber which may be supplied with high pressure fluid through a suitable fluid conduit means and fluid fitting, not shown.

The piston member 94 is adapted to engage and to energize the multiple disc brake assembly 52 as high pressure fluid is caused to enter the working chamber associated with the piston member 94 thereby braking the sun gear 48 to the transmission housing. The brake disc assembly 52 may be deenergized by a plurality of return springs 96 which may be interposed between the adaptor 54 and a ring 98, the latter engaging the piston member 94 as shown.

A suitable bushing 100 is provided as shown between the end of the power shaft 46 and the input shaft 28 to accommodate relative rotation between the same. Similarly, a suitable bushing is provided as shown at 102 to accommodate relative movement between sun gear 48 and carrier member 44. Suitable thrust bushings are provided at appropriate locations in the split power unit 14 as indicated at 104, 106, and 108.

The transverse wall member 88 is provided with a centrally disposed opening 110 through which the power shaft 46 extends. The wall member 88 is further provided with an annular shoulder 112 within which a bearing 114 is received. The bearing 114 functions to rotatably journal a power input bevel gear member 116 which is drivably splined at 118 to the end of the power shaft 46. The hub of the bevel gear 116 may be provided with an extension 118 which may be journalled by means of a suitable bearing 120 to a centrally disposed web structure 122 forming a portion of the main cast transmission housing 18.

The web structure 122 includes a centrally disposed portion, as shown in FIGURE 1, which surrounds the power output shaft 16. A circular shoulder 124 is formed on one lateral side of the web structure 122 within which a bearing 126 is received, said bearing 126 receiving and rotatably supporting a hub extension 128 of a second bevel gear 130. The hub extension 128 surrounds power output shaft 16 and a sleeve element 132 in turn surrounds the extension 128.

A transverse wall member 134 is secured to an inwardly directed web extension 135 of the cast housing portion 18 which encircles the shaft 16 as shown, and it is provided with a central opening 136 within which is fixed a bearing 138, said bearing 138 providing a second support for the gear 130.

Another hub extension 140 for the gear 130 extends axially through the transverse wall member 134 and carries a clutch member 142, said clutch member 142 being splined to extension 140 as shown at 144. The clutch member 142 extends in a generally radial direction and the periphery thereof is provided with internal spline teeth which receive mating, splined clutch plates 146.

A carrier member is shown at 148 and it includes an externally splined element 150 which is adapted to carry mating, splined clutch plates 152 situated alternately with respect to the clutch plates 146.

An inner sleeve 154 is concentrically disposed about the power output shaft 16 and is drivably splined to the carrier member 148 as shown at 156. A suitable bushing may be provided as shown at 158 for the purpose of rotatably journalling the bevel gear hub extension 138.

The clutch member 142 is formed with an annular shoulder 160 which extends axially to the right, as viewed in FIGURE 1, and which defines a cylindrical outer surface. A piston element 162 is situated adjacent the clutch member 142 and is concentrically disposed about the axis of the power output shaft 16 in sliding engagement with the hub extension 140. An internal cylindrical surface is defined by an annular shoulder 164 formed on the piston member 162, said cylindrical surface being slidably received over the surface formed on the shoulder 160 of the clutch member 142. The radially outward portion 166 of the piston member 162 defines an abutment or foot which is adapted to engage the stacked clutch plates 146 and 152 and to compress the same thereby providing a driving connection between clutch member 142 and carrier member 148. A suitable backup ring may be provided at 168 to absorb the axial thrust of the piston member 162.

The piston member 162 may be actuated by pressurized fluid which is caused to enter a fluid working chamber 170 through one or more passages 172 formed in the clutch member 142, through passage 174 formed in the gear hub extension 140, through an annular space 176 defined by and situated between the sleeve 154 and the gear hub extensions 128 and 140, and finally through a passage 180 formed in the hub extension 128, the sleeve 132 and the web structure 122. The passage 180 may communicate with a fluid supply conduit which in turn may communicate with a control valve mechanism later to be described.

The piston member 162 may be released by virtue of an axial biasing force exerted by springs 182 which may be seated upon a spring backup plate 184 secured to hub extension 140.

The carrier member 148, above described, forms a portion of a first compound planetary speed reduction unit, and it is adapted to rotatably journal a plurality of planet gears 185 upon pins 186 which may be secured to the carrier member 148 at angularly spaced locations. By preference, needle bearings 188 are employed to journal each individual planet gear 185 about one of the respective pins 186. A first sun gear 190 may be drivably splined to the power output shaft 16, as shown, and it is adapted to drivably engage each of the planet gears 185. A first ring gear member is shown at 192 and it is provided with internal gear teeth for drivably engaging the planet gears 185.

The ring gear 192 is secured to a second carrier member 194 and forms a part of the same, said member 194 being rotatably journalled about the axis of the power output shaft 16 by means of bearings 196 and 198, the former comprising a circular bushing which is received over and supported by an axial extension of the sun gear 190. The bearing 198 may similarly be received over and supported by a second sun gear member 200 which may in turn be securely splined to the power output shaft 16 adjacent the sun gear 190, as shown. The carrier member 194 is provided with pins 202 which are secured thereto and which are adapted to rotatably journal a plurality of planet gears 204, needle bearings 206 being provided for this purpose. Planet gears 204 are drivably engaged with sun gear 200.

A floating ring gear is provided at 208 and it is drivably engaged with planet gears 204. Clutch plates 210 may be splined to the outer periphery of ring gear member 208, as shown, and one or more other clutch plates 212 may be situated adjacent plates 210 to form a multiple disc clutch assembly, the clutch plate 212 being splined to and carried by clutch member 214 at the periphery thereof.

The clutch member 214 is comprised of a substantially radial portion and a central hub portion 216, the latter being securely splined to the power output shaft 16. The radial portion of the clutch member is formed with an annular cavity 218 which defines a fluid working chamber and an annular piston member 220 is slidably received therein as shown. The piston member 220 is disposed concentrically about the axis of power output shaft 16 and is slidably received on the hub portion 216 of clutch member 214. A radial abutment or shoe portion 222 is integrally formed on the piston member 220 and it is adapted to contact and to energize the clutch discs 210 and 212 of the associated multiple disc clutch assembly. Fluid may be admitted under pressure to the working chamber 218 through passage 224 formed in clutch member 214, through passage 228 formed in a circular adaptor member 230, and finally through a conduit 232 communicating with passage 228 as shown. Conduit 232 may communicate with a fluid supply conduit which in turn may communicate with the transmission control valve mechanism to be subsequently described. The piston member 220 may be retracted by means of a plurality of return springs 234 interposed between piston member 220 and a spring backup plate 236 disposed about the hub portion 216 of clutch member 214.

A brake disc 238 may be secured to the floating ring gear member 208 and stationary brake discs 240 may be situated adjacent disc 238 to form a multiple disc brake assembly, said brake discs 240 being splined about the periphery thereof to a circular anchor member 242. The member 242 may be secured by means of bolts or the like to the transmission cast housing, as shown.

The multiple disc brake assembly comprised of brake discs 238 and 240 may be energized by a piston member 244 situated adjacent thereto, said piston member 244 being substantially annular in shape and slidably positioned within an annular cylinder defined in part by the cast transmission housing 18 and by a peripheral web extension 246. The working chamber for this piston and cylinder assembly is situated between the web extension 246 and the piston 244 and high pressure actuating fluid may be admitted thereto through a passage 248 formed in the outer cast housing 18, said passage 248 communicating with a fluid supply conduit which extends to the transmission control valve mechanism. A plurality of springs 249 is interposed between the anchor member 242 and piston member 244 for the purpose of retracting the latter after the piston actuating fluid is exhausted.

Figure 2:
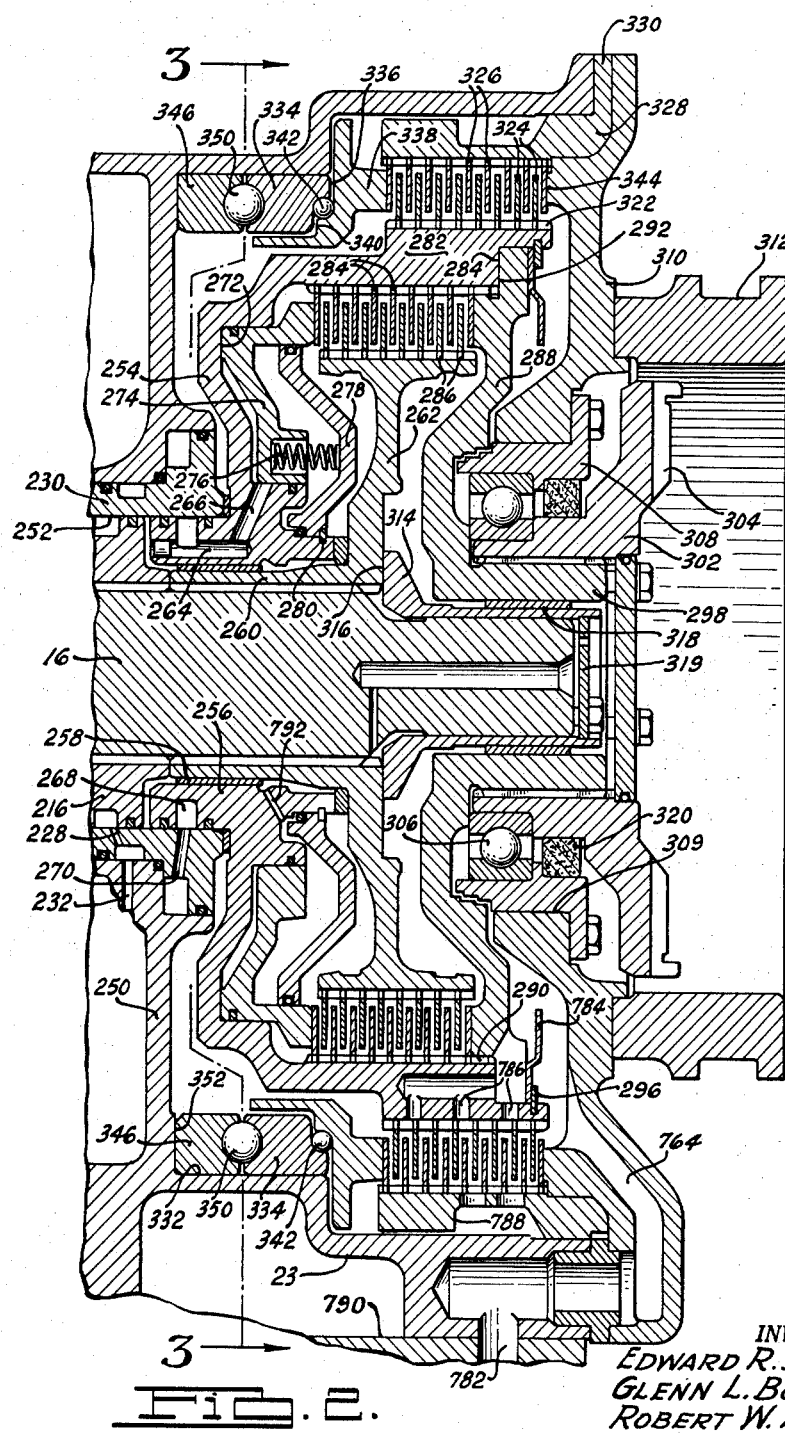
FIGURE 2 is an enlarged partial sectional view of one of the steering clutch and brake assemblies shown in FIGURE 1.

For the purpose of particularly describing the steering clutch and brake assembly 22, reference may be made to the subassembly view of FIGURE 2 wherein numeral 250 is used to designate a transverse wall structure which forms a web-like extension of the outer cast housing 23. A central opening 252 is formed in the wall structure 250 and the aforementioned adaptor 230 is received therethrough as shown.

The steering clutch and brake mechanism comprises a first member 254 which is concentrically mounted about the output shaft 16 and which includes a central hub portion 256 rotatably journalled upon a circular bushing 258, said bushing being received over a hub extension 260 of another clutch member 262. The hub extension 260 is securely splined to the power output 16 adjacent the hub 216 of the clutch member 214 described above. The hub portion 256 is received within the adaptor 230 and is provided with fluid passages 264 and 266 and an annular groove 268 as shown, the latter being adapted to communicate with another fluid passage 270 formed in adaptor 230, said passage 270 communicating with a fluid supply conduit, not shown, extending to the aforementioned control valve mechanism.

The member 254 is provided with an annular cavity 272 which defines a fluid working chamber within which an annular piston member 274 is slidably disposed. The working chamber defined by the cavity 272 may be supplied with actuating fluid through the above described fluid passages 264, 266 and 270 thereby causing the piston 274 to move axially to the right as viewed in FIGURE 2. A plurality of springs 276 may be provided for the purpose of biasing the piston 274 to the left and a suitable spring backup plate is provided at 278 for the purpose of providing a stationary spring seat as shown. Suitable fastening means such as a snap ring 280 may be provided, as shown, for the purpose of preventing relative movement between the backup plate 278 and the hub portion 256, said backup plate 228 being concentrically disposed about the hub portion 256.

A peripheral portion 282 of the member 254 is internally splined to receive a plurality of externally splined clutch plates 284, said plates being alternately positioned with respect to mating clutch plates 286 which are splined to the periphery of the clutch member 262 as shown. The clutch plates 284 and 286 comprise a multiple disc steering clutch assembly and they are adapted to be energized and engaged as the piston member 274 is actuated in an axial direction to the right, as viewed in FIGURE 2, thereby providing a driving connection between clutch member 262 and member 254.

The member 254 is further provided with a power output adaptor 288 which is formed with a substantially disc-like shape having an externally splined peripheral edge 290. The pitch diameter of the spline at 290 is such that the adaptor 288 may be received by the internal splines formed on the peripheral portion 282 of clutch member 254. The peripheral portion 282 is further provided with a shoulder 292 against which a shoulder formed about the periphery of adaptor 288 may be positioned. The adaptor 288 may be held in position by means of a snap ring 296.

The central portion of adaptor 288 defines a centrally apertured hub extension 298 which may be splined as shown at 300 to the hub portion 302 of a power output flange 304, said flange 304 being adapted to be drivably connected to a power absorbing means such as the sprocket wheels of a track-laying vehicle as previously described. A bearing 306 is disposed about the flange hub portion 302 and is adapted to journal the same within a fixed bearing support 308, said support 308 being secured within a central aperture 309 in an end plate 310. The end plate 310 may be securely fixed to the stationary transmission cast housing 23 by means of bolts or the like. A suitable adaptor 312 may be secured to the end plate 310, if desired, for the purpose of enclosing the connection between the power output flange 304 and the vehicle sprocket wheel.

A spacer element or retainer 314 may be threadably received over a reduced diameter end of shaft 16, said spacer including a radial shoulder portion having an end surface 316 in contact with clutch member 262 for axially positioning the latter. A cylindrical bushing element 318 is disposed about the spacer 314 to accommodate relative rotation between the spacer 314 and the hub portion 298 of the power output adaptor 288. Spacer 314 further includes an apertured end plate 319 which may be bolted to the reduced diameter end of shaft 16 as shown, said plate 319 being fixed to the cylindrical portion of spacer 314.

A suitable oil seal may be provided as shown at 320 next to bearing 306 to prevent the escape of lubricating oil from the interior of the steering clutch and brake assembly.

The exterior surface of the peripheral portion 282 of the member 254 is provided with axially extending splines at 322 upon which internally splined friction brake discs 324 are received, said discs 324 being movable about the axis of shaft 16 with the member 254. Friction brake discs 326 are alternately interposed between the discs 324 and are externally splined to a fixed anchor member 328. Anchor member 328 is substantially annular in shape and is provided with a radially extending portion 330 which may be securely bolted to the end surface of cast housing portion 23 adjacent the end plate 310.

The interior surface of cast housing portion 23 may be provided with a cylindrical surface and a circular brake actuator ring 334 may be disposed within the housing portion 23 in axially slidable relationship with respect to the surface 332. A shoulder 336 is formed on the actuator ring 334 as shown.

A substantially annular brake disc abutment member or brake actuator member 338 is disposed within the housing portion 23 between the brake discs 324, 326 and the brake actuator ring 334. A shoulder 340 is formed on one side of the abutment member 338 and a plurality of steel balls 342 are disposed in the spaces between the shoulder 340 and the above-mentioned shoulder 336 on the actuator ring 334, said balls 342 functioning as thrust bearings. Another abutment surface 344 is formed on the end plate 310 for the purpose of absorbing the thrust which may be applied to the brake discs 324 and 326 by the abutment member 338 while the steering brake is being energized.

Figure 3:
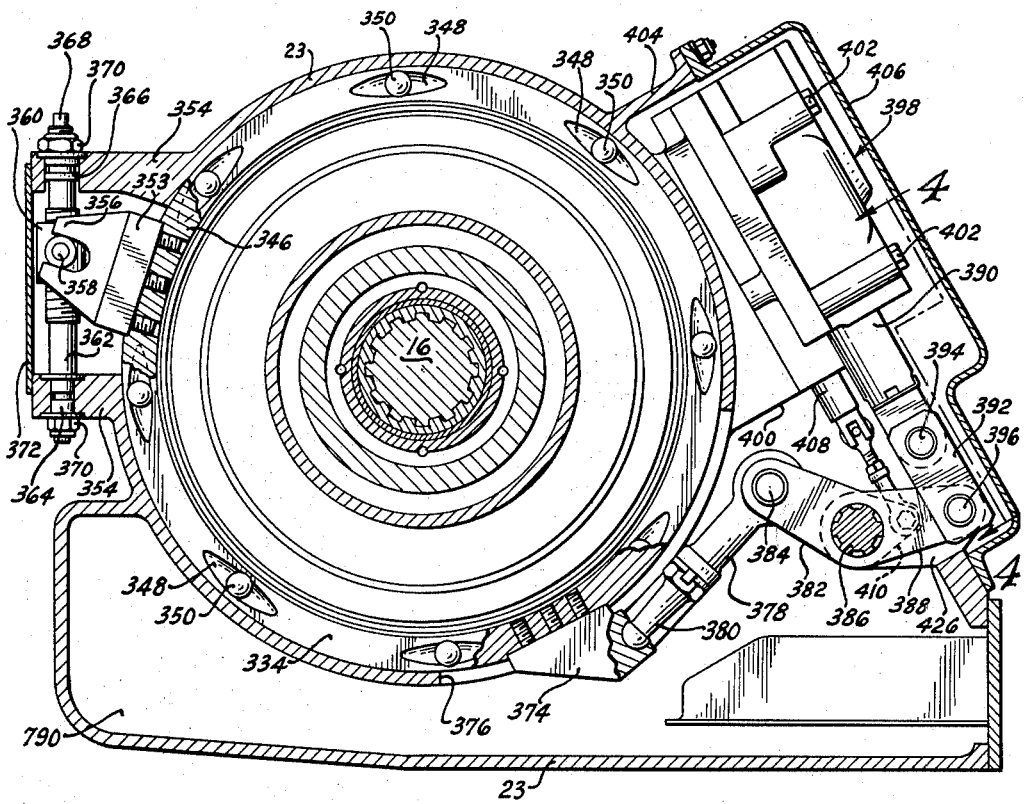
FIGURE 3 is a sectional view of the steering brake mechanism of FIGURE 2 and is taken along the section line 3—3 of FIGURE 2.

A circular cam ring 346 is disposed within the housing portion 23 adjacent the actuator ring 334 and it is fixed to the housing portion 23 through a brake adjusting mechanism to be described subsequently. As best seen in FIGURE 3, the actuator ring 334 is provided with recessed cam surfaces 348 at a plurality of locations on one axial side thereof, each cam recess being adapted to accommodate a steel cam element or ball 350. The cam ring 346 may similarly be provided with recessed cam surfaces which are disposed in juxtaposed relationship with respect to cam recesses 348 and which are also adapted to receive the steel balls 350. Cam ring 346 is positioned against a radial shoulder 352 formed on the transverse wall structure 250. It will be apparent from an inspection of the drawings that as the actuator ring 334 is rotated about the axis of the shaft 16, the steel balls 350 will ride up on the associated cam surfaces thereby exerting an axial thrust force on the brake disc abutment member 338. This in turn causes the brake discs 324 and 326 to become frictionally engaged thereby braking the member 254 to the stationary housing portion 23.

As best seen in FIGURE 3, the cam ring 346 has secured thereto a forked adjusting member 353 which extends radially outward into a protruding portion 354 of the cast housing 23. The outermost end of member 352 is provided with fingers 356 which define a slot within which a projection 358 is received. Projection 358 forms a portion of an internally threaded nut member 360 which is threadably received upon an adjusting screw member 362. The member 362 is comprised of a central threaded portion and two bearing portions 364 and 366 which are received within separate aligned apertures formed in the protruding housing portion 354. The member 362 may be rotated by means of an external projection 368 which may accommodate a suitable hand tool. A pair of nuts 370 may be threadably received over each of the outwardly projecting ends of the member 362 for the purpose of preventing rotation of the member 362 after a cam adjustment has been made. It is, of course, apparent that the nut member 360 will move axially along the threaded portion of member 362 as the latter is rotated which in turn causes the cam ring 346 to rotate about the axis of shaft 16. A suitable removable cover plate 372 may be provided as shown to provide a complete enclosure for the cam adjusting mechanism.

Figure 4:
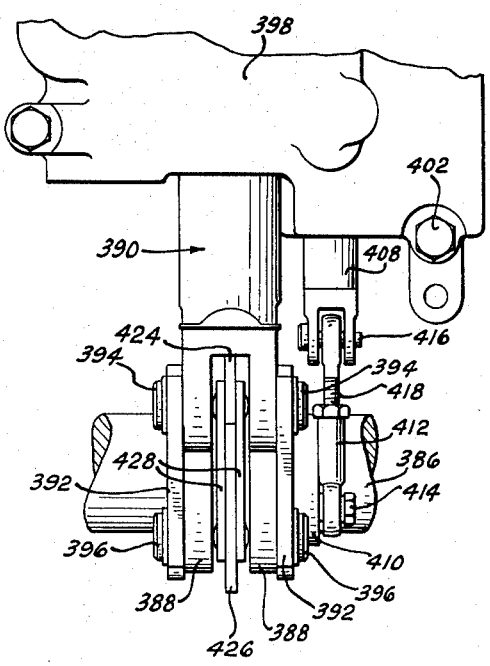
FIGURE 4 is a plan view showing portions of the linkage mechanism for steering brake structure of FIGURE 3.

The actuator ring 334 may be rotated about the axis of shaft 16 by means of a toggle mechanism best seen in FIGURES 3 and 4. This toggle mechanism includes an abutment member 374 which may be securely bolted to the periphery of the actuator ring 334 and which may protrude from the surrounding cast housing portion 23 through a slot 376. The projecting abutment member 374 may be contacted by a first link element 378 having a finger 380 as shown. Link element 378 forms a portion of a toggle mechanism which further includes a link member 382, members 378 and 382 being pivotally joined at 384. The link member 382 may be splined to a brake operating or control shaft 386 which may extend externally of the transmission housing. The extended end of the control shaft 386, not shown, may be positively connected to a suitable brake lever which may be positioned so that it is accessible to the vehicle operator. As the vehicle operator applies a braking effort to shaft 386, the toggle linkages 382 and 378 produce a tangential thrust upon the actuator ring 334 which in turn produces an axial thrust upon the brake disc abutment member 338 as previously described.

For reasons which will subsequently become apparent, the splined connection between shaft 386 and the toggle link 382 is adapted to accommodate a certain degree of free play thereby effecting a lost motion in the linkage.

A bifurcated arm 388 may be integrally joined to the link member 382 and it extends transversely of the shaft 386 in an outward direction. By preference, link member 382 and arm 388 are formed as a single member which is rotated as a unit about the axis of shaft 386. The extended end of arm 388 is joined to a piston rod, designated in FIGURES 3 and 4 by numeral 390, by double toggle links 392, one end of the links 392 being pivotally connected to the end of piston rod 390 at 394 and the other end thereof being positively connected to the extended end of arm 388 at 396. As best seen in FIGURE 4, the separate bifurcations of the arm 388 are each connected to separate ones of the double toggle links 392.

The above-mentioned piston rod comprises a portion of a power boosting servo mechanism, the outer housing of which is generally shown at 398 in FIGURES 3 and 4. The structure and operation of the servo mechanism 398 will subsequently be described in particular detail. The housing for the servo mechanism 398 is fixed to a boss 400 formed on the exterior of the transmission housing portion 23, bolts 402 being provided for this purpose. A suitable enclosure wall 404 may be formed at the exterior of the cast housing portion 23 for the purpose of enclosing the servo mechanism 398. A suitable removable cover 406, as seen in FIGURE 3, may be bolted over the servo mechanism 398 for the purpose of completing the enclosure of the same.

A clutch relay control valve element, shown at 408, is slidably disposed within the housing for the servo mechanism 398 and the outwardly extending end thereof is linked to a transverse extension 410 formed on shaft 386 by means of a link element 412. One end of element 412 is pivotally secured to extension 410 by means of an eyelet and pivot pin as shown at 414. Similarly, the other end of link element 412 is pivotally joined to the valve element 408 by means of an eyelet and pivot pin connection 416. The position of valve element 408 with respect to the shaft 386 may be adjusted by means of a threaded connection, shown at 418, between the axially adjustable portions of the link element 412.

As best seen in the schematic assembly views of either of FIGURES 5, 6, or 7, the piston rod 390 comprises in part a central shaft 420 and a surrounding sleeve 422, the latter being bifurcated, as shown in FIGURE 4, and positively and pivotally joined to the double toggle links 392 by the pivotal connection 394 as previously described. The centrally disposed shaft 420 includes an outwardly extending portion, shown in FIGURE 4 at 424, which is situated between the bifurcations of the sleeve 422 at the extended end of piston rod assembly 390. An arm 426 is securely splined to shaft 386 and the extended end thereof is positively linked to the outer end of the shaft portion 424 by means of a pair of toggle link elements 428, the two ends of link elements 428 being pinned to the ends of arm 426 and shaft portion 424, respectively, as shown. Arm 426 is preferably disposed between the bifurcations of arm 388, both arms 426 and 388 being splined to the same common shaft as shown. However, as previously mentioned, a certain degree of free play or lost motion is provided in the splined connection between shaft 386 and arm 388 whereas no free play is provided between arm 426 and shaft 386.

Referring again to the assembly view of FIGURE 1, it is seen that the main transmission cast housing 18 is provided with an inwardly extending web extension 430 which is similar in form to the above-mentioned extension 135. A transversely extending wall member 432 is secured to the web extension 430 as shown and is provided with a central aperture 434 through which a hub extension 436 is received, said hub extension 436 being rotatably journalled in aperture 434 by means of a bearing 438. Hub extension 436 forms a portion of a bevel gear member 440 which is drivably engaged with the aforementioned bevel gear 116. Another hub extension 442 is formed on bevel gear 440 and it extends axially within the aforementioned web structure 122. A second bearing 444 is adapted to rotatably support the hub extension 442 within the web structure 122.

The above-described sleeve 154 disposed about shaft 16 extends axially through the transverse wall structure 432 into the compounded planetary gear assembly 10 and it is splined as shown at 446. A reverse clutch element, shown at 448, is provided with an internally splined apertured hub portion which receives the splined sleeve 154 to effect a positive driving engagement therebetween. Similarly, a pair of planetary sun gear elements, shown at 450 and 452, may be securely splined to sleeve 154, the clutch element 448 and the sun gear elements 450 and 452 being situated in adjacent, abutting relationship and adapted to rotate as a unit with sleeve 154.

Hub extension 436 is externally splined, as shown at 454, to another reverse clutch element 456 which extends in a substantially radial direction and which is concentrically disposed about the shaft 16. The periphery of clutch element 456 extends axially, as shown, and is provided with internal splines which are adapted to receive externally splined clutch discs 458. A suitable backup ring 460 is also secured to the splined periphery of clutch element 456 and is retained in a fixed axial position by a suitable snap ring. The clutch element 448 is also provided with a splined, axially extending peripheral portion which is adapted to receive and to carry a plurality of clutch discs 462, the discs 458 and 462 being alternately situated in adjacent relationship to form a multiple disc clutch assembly. The clutch discs 458 and 462 may be frictionally engaged by means of a piston member 464 having an abutment or foot portion 466 which is adapted to engage the disc assembly and energize the same upon axial movement thereof.

The clutch member 456 and the piston member 464 are formed with mating annular shoulders 468 and 470 respectively. The piston member 464 is annular in shape and is slidably disposed on the hub extension 436 of bevel gear 440. A fluid working chamber 472 is defined by the relatively movable clutch element 456 and piston member 464 and it is in fluid communication with an annular passage or space 474 between the sleeve 154 and the hub extensions 436 and 442 for gear 440, fluid passages 476 and 478 being provided for this purpose. Fluid may be admitted to the annular passage 474 through a passage means 480 formed in hub extension 442, sleeve 132 and web structure 122 for the purpose of energizing the reverse clutch assembly to effect a frictional driving engagement between clutch elements 448 and 456. A backup plate 482 may be received over the hub extension 436 and retained therein by a suitable snap ring and a plurality of return springs 484 may be interposed between the plate 482 and the friction member 464 to retract the latter as the working chamber 422 is relieved of clutch actuating pressure.

A planetary carrier member is shown at 486 and is rotatably supported by a bushing 488 received over a circular shoulder formed on the clutch element 448. A plurality of planet gears 490 are carried by pins 492 and rotatably mounted thereon by needle bearings 494, said pins 492 being in turn carried by the carrier member 486 as shown. Each of the planet gears 490 are adapted to drivably engage sun gear 450 and a floating ring gear member 496, the latter being externally splined to accommodate internally splined brake discs 498. An annular brake anchor member 500 is secured at its outer periphery to the transmission cast housing 18 as shown and is further provided with an internally splined portion 502 which is adapted to receive and to retain stationary brake disc 504, the discs 498 and 504 being alternately disposed in adjacent relationship to form a multiple disc brake assembly. A thrust shoulder is formed about the inner edge of anchor member 500 at 506 to absorb the normal braking force which may be applied to discs 498 and 504. An annular piston member 508 is slidably disposed within a cylindrical surface 510 formed within the cast housing portion 18 and a web extension 512 is formed adjacent piston member 508 for the purpose of defining a fluid working chamber 514 behind the latter. Brake actuating fluid may be supplied to working chamber 514 through a suitable externally extending conduit 516. Return springs 517 may be interposed between anchor member 500 and piston member 508 for the purpose of retracting the latter when brake actuating fluid pressure is relieved.

Carrier member 486 includes an outwardly extending portion 518 to which is secured another ring gear member 520 forming a portion of another planetary gear assembly. A carrier member for this latter gear assembly is shown at 522 and it is securely splined to the power output shaft 16 as shown at 524. Planet gears 526 are rotatably mounted upon pins 528 carried by carrier member 522, suitable needle bearings 530 being provided for this purpose. Planet gears 526 drivably engage sun gear 452 and ring gear 520.

Ring gear 520 may be provided with an additional supporting plate 532 which may be journalled upon a bushing 534 received over and supported by a suitable shoulder formed on carrier member 522.

The outer periphery of ring gear member 520 may be splined for the purpose of receiving and carrying internally splined brake discs 536. Other brake discs 538 are disposed alternately in adjacent relationship with respect to brake discs 536 and are externally splined to an internally splined portion 540 of anchor member 500 and fixed thereto in a stationary position. A thrust shoulder 542 is formed on the anchor member 500 to absorb the braking forces which may be applied to the brake disc assembly 536, 538.

The discs 536 and 538 may be frictionally engaged by an annular piston member 544 having an abutment or foot portion adapted to engage the stacked brake disc assembly 536, 538. The main body portion of piston member 544 is slidably received within an annular recess 546 in the cast housing portion 21 which is effective to define a fluid working chamber behind piston member 544. Actuating fluid may be admitted to the working chamber through a suitable fluid passage 548 to energize the brake assembly 536, 538 and springs 550 may be interposed between a backup ring 552 and piston member 544 to retract the latter when the brake energizing fluid pressure is relieved.

The steering clutch and brake assembly 20 disposed about the left end of the power output shaft 16, as viewed in FIGURE 1, is substantially identical in structure and function as the steering clutch and brake assembly 22 previously described, one being substantially the mirror image of the other. The structural details of the assembly 20 will readily be apparent from an inspection of FIGURE 1 in view of the foregoing detailed description of assembly 22. It may be observed, for example, that the power output shaft 16 may be clutched to a power output flange, shown at 304′, through a clutch assembly comprising clutch members 288′ and 262′, said assembly further including multiple clutch discs 284′ and 286′. Output flange 304′ may be braked to the housing portion 21 through a multiple disc brake assembly comprising brake discs 324′ and 326′. A cam ring 346′ and a brake actuator ring 334′ are provided, as shown, for energizing the multiple disc brake assembly 324′ and 326′.

Operation of the Compounded Planetary Elements

For the purpose of briefly describing the operation of the multiple speed transmission elements illustrated in FIGURE 1, the following table may be used as a guide in following the various power flow paths which are obtained during forward operation:

| To Obtain— | Energize the Following— |
| --- | --- |
| 1st speed | Clutch 146,152—brake 52—brake 536,538. |
| 2nd speed | Clutch 146,152—clutch 66—brake 536,538. |
| 3rd speed | Clutch 146,152—brake 52—brake 498,504. |
| 4th speed | Clutch 146,152—clutch 66—brake 498,504. |
| 5th speed | Clutch 146,152—brake 52—clutch 210,212. |
| 6th speed | Clutch 146,152—clutch 66—clutch 210,212. |
| 7th speed | Clutch 146,152—brake 52—brake 238,240. |
| 8th speed | Clutch 146,152—clutch 66—brake 238,240. |

During forward operation, the forward clutch 146, 152 is continuously energized and during reverse operation the reverse clutch 458, 462 is continuously energized. In all other respects, reverse operation is identical to forward operation, the full range of eight speeds being obtainable in each case.

Assuming that the forward clutch 146, 152 is energized and that the transmission is operating in the first speed range, power may be delivered to the power input flange and is transferred to gear 116 through planetary units 40, 42, and 50 through shaft 46. The power is then transferred to gear 130, through clutch 146, 152, through carrier 148, through sleeve 154, through sun gear 452, through carrier 522 and then to the power output shaft 16.

The power flow path for second speed operation is identical to that above described except that the sun gear and carrier of the split power unit 14 are now both connected to the common shaft 46 and the power input shaft 28 and shaft 46 now turn as a unit at the same speed.

During third speed forward operation, power is again delivered through the split power unit to shaft 46 and gear 116, through gear 130, through clutch 146, 152 through carrier 148 and sleeve 154, through sun gear 450, carrier 486, ring gear 520, carrier 522 and then to the power output shaft 16.

The power flow path for fourth speed operation is the same as that which exists for third speed operation except that the split power unit 14 is again bypassed, the sun gear 50 being clutched to the same shaft 46 to which carrier 44 is splined thereby causing shafts 28 and 46 to turn as a unit.

The power flow path for fifth speed operation includes the flanges 24, shaft 28, split power unit 14, shaft 46, gears 116 and 130, clutch 146, 152, carrier 148, ring gear 192, carrier 194, clutch 210, 212, clutch member 214 and finally the output shaft 16. It will be noted that the above-mentioned compounded planetary elements 192, 190, 184, 200, 194, and 208 turn together as a unit to effect a reduction ratio of unity, the overall reduction ratio at this speed being that which is obtained in the bevel gears 116 and 130 and in the split power unit 14.

The power flow path for the sixth speed operation is identical to that above set forth for fifth speed operation with the exception that the split power unit 14 is again bypassed.

During seventh speed operation, power is delivered through the split power unit 14, through shaft 46, through gears 116 and 130, through clutch 146, 152 and through the planetary unit 192, 184, 148, and 190 to the power output shaft 16. Since power is being delivered to carrier 148 and the ring gear 192 is braked while power is taken off the sun gear 190, the shaft 16 is overspeeded with respect to gear 130.

The power flow path for eighth speed operation is the same as that above described for seventh speed operation except that the split power unit 14 is again bypassed.

Automatic Transmission Control Valve Assembly of FIGURE 8

An automatic control means is schematically illustrated in FIGURE 8 and it is effective to energize the respective clutches and brakes for the planetary gear elements in an operative sequence during operation to selectively obtain the above-described speed reduction ratios. This automatic control means is principally comprised of eleven valve elements which are separately identified in FIGURE 8 as the governor valve, the pilot valve, the main relay valve, the transmission clutch relay valve, the selector valve for obtaining forward, reverse or neutral operation, the split power shaft valve, the split power exhaust control valve, the throttle modulating valve, the oil pressure modulating valve, the manual lock down valve and the governor pump pressure distributor valve. All of the above-mentioned valves may be conveniently disposed in a single valve body.

Referring first to the governor valve, it is comprised of a body portion 554 having a cylindrical bore within which concentrically disposed sleeves 556 and 558 are positioned, the sleeve 558 being axially movable within sleeve 556. A series of flip jet openings 560 are formed in the sleeve 558 and a series of progressive jet openings 562 are formed in sleeve 556. An orifice 564 is formed in sleeve 556 and is adapted to communicate with one of the flip jets 560. An exhaust opening 566 is provided about the flip jets and progressive jets 560 and 562 respectively.

Sleeve 558 is integrally formed with a piston member 568 which is subjected to governor pump discharge pressure on the left side thereof, as viewed in FIGURE 8, and to modulated line pressure on the other side. An orifice 570 is formed in the piston member 568 and it communicates with one of a plurality of passages 572 which in turn communicate with the manual lock down valve as shown.

The pilot valve is comprised of a cylindrical bore within which a sleeve 574 is received. A pilot valve plunger 576 is slidably disposed in sleeve 574 and is adapted to contact the piston member 568 of the governor valve, a spring 578 being positioned on one side of plunger 576 to urge the latter against piston member 568. A series of evenly spaced valve lands 580 are formed about plunger 576 and they are adapted to selectively open a fluid passage 582 to regulated line pressure from a passage 584 and to exhaust fluid pressure from passage 582 through an exhaust port. For convenience, all exhaust ports will be identified in FIGURE 8 by the symbol "Ex." Another valve land is provided on plunger 576 at 586 in spaced relationship with respect to lands 580 and it is adapted to provide communication between passage 584 and any one or all of three fluid passages shown at 588, 590, and 592.

The main relay valve comprises three bores of varying diameter, plunger 594 being slidably disposed in the largest diameter bore, plunger 596 being slidably disposed in the next largest diameter bore, and plunger 598 being slidably disposed in the smallest diameter bore. The plunger 598 is provided with four valve lands 600 which are adapted to selectively distribute modulated line pressure from a passage 602 to any one of four passages 604, 606, 608, and 610 which respectively communicate with the first and second speed brake, the third and fourth speed brake, the fifth and sixth speed clutch and the seventh and eighth speed brake.

The split power shift valve comprises a spaced valve element 611 having valve lands 612 which are adapted to selectively control the distribution of modulated pressure from passage 602 to either the split power brake 52 or the split power clutch 66. Valve element 611 is spring loaded at one end thereof and is loaded with regulated line pressure from passage 582 at the other end thereof.

The split power exhaust control valve communicates with the split power shift valve by means of an exhaust passage 614 and it comprises a spool valve element 616 having valve lands 618 which are effective to retard the rate at which energizing fluid pressure is exhausted from clutch 66 during a shifting operation from second to third speeds, from fourth to fifth speeds, and from sixth to seventh speeds. A mechanical linkage shown at 620 and 622 is provided for operatively connecting valve element 616 and plunger 598.

The throttle modulating valve comprises a valve plunger 624 having a series of metering orifices 626, said plunger being slidably disposed in a valve bore which is provided with annular chambers 628 and 630, the latter communicating with the hollow interior of valve plunger 624. The governor pump supplies annular chamber 630 with governor pump discharge pressure through passage 632. Plunger 624 may be slidably positioned by means of a throttle linkage element 634 which is under the control of the vehicle operator. At engine throttle positions which approach a wide open setting, the plunger 624 is moved to the left thereby providing a restricted communication between passage 632 and a passage 636 through orifices 626, the greater the throttle setting the higher the modulated pressure in passage 636.

The above-mentioned passage 636 extends to the manual lock down valve which comprises a movable valve element having a fluid bypass portion 638 and a valve land portion 640, the former providing communication between passage 636 and a passage 642, and the latter selectively restricting certain ones of the plurality of passages 572. Passage 642 delivers modulated governor pressure to the chamber on the right side of piston member 568 in the governor valve.

The selector valve is comprised of a movable valve element 644 having a plurality of valve lands 646 which are effective to distribute line pressure from passage 648 to either the reverse clutch or the forward clutch. A suitable manually operable linkage mechanism shown at 650, 652, 654, and 656 is provided for adjusting the valve element 644 to a reverse, a forward or a neutral position. A hydraulically loaded detent means 658 is provided for maintaining the valve element in one of its three operative positions and a passage 660 is provided for supplying the detent means with fluid pressure. As shown in FIGURE 8, valve element 644 is in the forward operating position.

The governor pump distributor valve is adapted to interconnect the pump discharge pressure ports to the governor valve regardless of the direction of rotation of the governor pump rotors. During forward operation, the distributor valve assumes the position shown in FIGURE 8 and during reverse operation, when the governor pump rotors are rotating in the opposite direction, the distributor valve is moved vertically upward. The above-described manually operable linkage mechanism causes the distributor valve and the selector valve to move together in tandem.

The line pressure modulating valve comprises a spring loaded ball valve element 662 which may be unseated by the supply line pressure to supply the transmission planetary clutches and brakes with a modulated pressure. The magnitude of this pressure may be varied in proportion to engine throttle setting by means of a spring 664 seated on ball valve element 662, the magnitude of the compressive force in spring 664 being varied by throttle linkage element 634.

The transmission clutch relay valve includes a movable valve element 666 which is adapted to progressively restrict the fluid pressure in supply line 648. A manually operable, spring loaded plunger 668 is provided for urging the element 666 to the left against an opposing fluid pressure acting on the left side of element 666 as viewed in FIGURE 8. When the vehicle operator depresses the clutch lever, the valve element 666 moves to the right thus preventing either the forward clutch or the reverse clutch from being energized. As the clutch lever is retracted, the valve element progressively opens the forward or reverse clutch to line pressure thereby gradually energizing the same. This provides smooth operation during starting. When the vehicle is operating in third speed range or any higher speed range, fluid pressure is admitted to the right side of plunger 668 to prevent declutching of the forward or reverse clutch, passage 670 being provided for this purpose.

For the purpose of providing a reduced or regulated supply line pressure in passage 584, a spring loaded ball valve 672 is provided as shown in the passage 584, a suitable value for the supply line pressure being 200 p.s.i. and a suitable value for the regulated line pressure being 70 p.s.i.

*Operation of Transmission Control Valve Assembly of FIGURE 8*

During first speed operation of the transmission, the various control valve elements, above described, assume the positions shown in FIGURE 8. The governor pump pressure acting on the left side of the piston 568 of the governor valve is designated in FIGURE 8 by means of diagonal shading lines extending in a first diagonal direction and the modulated governor oil pressure acting on the right side of the piston 568 is designated by diagonal shading lines extending in another diagonal direction. The supply line pressure is designated by means of horizontal shading marks and the regulated supply line pressure is designated by crossed shading marks. The modulated line pressure which energizes the various transmission clutches and brakes is designated by means of dotted shading.

To obtain forward drive, the selector valve is moved to the forward position, as shown in FIGURE 8, and this allows line pressure to pass from supply passage 648, through the transmission clutch relay valve, through the space between two adjacent lands 646 of the selector valve and finally into the forward clutch.

The transmission clutch relay valve is shown in the fully advanced position which allows free passage of fluid pressure therethrough. However, if the vehicle operator depresses the vehicle clutch pedal, the valve is shifted to the right against the opposing spring pressure thereby blocking the supply line pressure and preventing the forward clutch from being energized. As the clutch is gradually retracted, the valve moves to the left, as viewed in FIGURE 8, thereby causing a progressively increasing pressure buildup to take place in the forward clutch.

The line pressure modulating valve produces a modulated pressure in passage 602 which is determined by the force exerted by spring 664 on ball valve element 662. The magnitude of this spring force is determined by the angular position of throttle valve element 634. It will be apparent from an inspection of FIGURE 8 that the modulated line pressure communicates with the first and second speed brake 536, 538 through passage 604, the interior of valve element 598 of the main relay valve, and passage 602.

The regulated line pressure in passage 584 communicates with the right side of the valve element 611 of the split power shift valve through passages 584 and 582 and the space between valve lands 586 and 580 on the plunger 576 of the pilot valve, the split power shift valve element 611 thereby being shifted to the left. When in this position, valve element 611 provides communication between the split power brake 52 and the line 602 thereby causing the former to become energized. Since brake 52 and brakes 536, 538 are both thus energized, the transmission will operate in the first speed range.

As the vehicle speed increases at a constant engine throttle setting, the governor pump discharge pressure also increases and the governor valve piston 568 is urged to the right. The fluid flow which had been passing through the orifice 564 in the sleeve 556 is restricted and this is accompanied by a momentary pressure buildup behind piston 568. The first flip jet 560 thereby becomes completely blocked off and the piston 568 and sleeve 560 move quickly to the right until the second flip jet 560 is opened. The first progressive jet 562 is simultaneously opened at this point and the total area through which the governor pump discharge pressure may exhaust is thereby increased. The piston 568 then becomes stabilized in a new position. When in this new position, the first valve land 580 on pilot valve plunger 576 causes line 582 to be blocked and the pressure urging the split power relay valve element 611 to the left is relieved. The valve element 611 is thereby caused to move to the right under the influence of the end spring pressure and the split power clutch 66 is thus energized with the modulated line pressure. The pressure in brake 52 is simultaneously exhausted through a restricted exhaust opening. This exhaust opening is restricted for the purpose of retarding the rate of exhaust of the brake energizing fluid thereby causing the brake 52 to remain energized during the time interval in which the pressure is building up in clutch 66. This prevents overspeeding of the engine during the shifting operation thereby providing a smooth transition into the next speed range. The clutch 66 and the brake 536, 538 are therefore energized and the transmission operates in second speed.

Upon a further increase in vehicle speed at constant engine throttle setting, the pump discharge pressure for the engine driven governor pump is further increased thereby urging the governor valve piston 568 and sleeve 558 further to the right. This restricts the second flip jet 560 and a further pressure buildup occurs behind piston 568 thereby causing the piston 568 and sleeve 558 to move quickly to the next axial position. When the next position is reached, the third flip jet is uncovered and the second progressive jet 562 is simultaneously uncovered. The resulting increased exhaust area for the pump discharge pressure causes the piston 568 to stabilize at this new position. When this occurs, the valve lands 580 on plunger 576 again permit regulated line pressure to enter passage 582 and the split power shift valve element 611 is again shifted to the left thereby causing brake 52 to become energized with modulated line pressure. The pressure in clutch 66 is exhausted through the split power exhaust control valve which is effective to restrict the passage of fluid from clutch 66 to the exhaust port during the shifting operation of the main relay valve. The clutch 66 is therefore energized for a short interval of time during which the pressure in brake 52 and brake 494, 504 is building up, and this in turn prevents a sudden overspeeding of the engine and effects a smooth transition from one speed range to the other. Simultaneously, the valve land 586 on the pilot valve plunger 576 uncovers passage 588 and allows regulated line pressure to pass into the main relay valve behind the first valve plunger 594 thereby moving plunger 594, plunger 596, and plunger 598 to the left. This allows modulated line pressure to pass from passage 602, through plunger 598 and into passage 606, the valve lands 600 uncovering the passage 606 when plunger 598 assumes this position. The lands 600 simultaneously open passage 604 and brake 536, 538 to exhaust. The brake 52 and the brake 498, 504 are therefore energized and this results in third speed operation. It will be further noted that the plunger 668 for the clutch relay valve is subjected to regulated line pressure by virtue of the fluid communication provided by passage 670. Thus, when the transmission is operating in the third speed range or any higher speed range, the operator may not release the clutch relay valve or deenergize the forward clutch.

Upon a further increase in engine speed at constant engine throttle setting, the discharge pressure for the engine driven governor pump increases to a sufficiently high value to cause the fourth flip jet 56 and the third progressive jet 562 to become uncovered. The new position assumed by the piston 568 causes the plunger 576 to be shifted to the right thereby causing the lands 580 to again block the passage 582, the split power shift valve 611 being urged to the right by the end spring force. This causes modulated line pressure to again energize clutch 66. The clutch 66 and the brake 498, 504 are therefore simultaneously engaged and the transmission will operate in the fourth speed range.

Upon a further increase in engine speed at constant engine throttle setting, the fifth flip jet 560 and the fourth progressive jet 562 are opened and the plunger 576 is moved to a position where the lands 580 will again uncover passage 582 thereby causing brake 52 to become energized while the clutch 66 is exhausted through the split power exhaust control valve. Simultaneously, the valve land 586 on the pilot valve plunger 576 uncovers passage 590 which causes the plunger 596 and the plunger 598 to shift to the left. This in turn causes the lands 600 to uncover passage 608 thereby providing communication between the clutch 210, 212 and the passage 602 through the plunger 598 and passage 608. The movement of plunger 598 effects a shifting movement of the split power exhaust control valve element 616 which retards the rate at which the clutch 66 is deenergized thereby assuring that the clutch 66 will remain energized during the time interval in which the pressure in brake 52 and clutch 210, 212 is building up. The third and fourth speed brake 498, 504 is exhausted as the plunger 598 assumes this new position. Since clutch 210, 212 and brake 52 are thus simultaneously energized, the transmission operates in the fifth speed range.

As the engine speed increases still further at constant engine throttle setting, the piston 568 is moved to the right with the sixth flip jet and the fifth progressive jet are opened to exhaust. The valve lands 580 on the pilot valve plunger 576 then again block passage 582 and the split power shift valve 611 again moves to the right thereby causing clutch 66 to become energized while brake 52 is exhausting. Since clutch 210, 212 and clutch 66 are simultaneously energized, the transmission operates in the seventh speed range.

Upon a further increase in engine speed at constant engine throttle setting, the seventh flip jet 560 and the sixth progressive jet are opened to exhaust and the lands 580 again open passage 582 to fluid communication with passage 584 thereby causing the clutch 66 to become deenergized and the brake 52 to become energized. Simultaneously, valve land 586 on pilot valve plunger 576 uncovers passage 592 thereby shifting plunger 598 further to the left which causes the fifth and sixth speed clutch 210, 212 to exhaust and the brake 238, 240 to become energized. The split power exhaust control valve is again shifted to control the rate at which clutch 66 is exhausted. Since brakes 52 and 238, 240 are both engaged, the transmission operates in seventh speed.

As the engine speed increases still further at constant engine throttle setting, the piston 568 and plunger 576 are again moved to the right so that passage 582 will again become blocked which will permit the split from shift valve 611 to shift to the right to cause the clutch 66 to be energized and to cause brake 52 to exhaust. The transmission therefore operates in the eighth speed range.

When the transmission operates in the third speed range or in any higher speed range, fluid is admitted under regulated line pressure through passage 660 to the detents 658 in the selector valve to prevent a shift from the forward drive range to neutral or reverse. This feature, together with the above-described fluid locking feature of the clutch relay valve, is a safety measure which prevents an undesirable shifting from one range to the other while the vehicle is moving at speeds greater than a safe maximum limiting speed. Also, the output load may not be suddenly relieved by the forward clutch when the engine is operating under a load in the higher speed ranges.

The modulated line pressure is determined by throttle position by virtue of the operation of the line pressure modulating valve. As the throttle opening is increased, the clutch and brake actuating pressure for the transmission elements is correspondingly increased.

The throttle modulating valve is effective to increase the modulated pressure acting on the right side of piston 568 as the engine throttle opening is increased. Thus, the engine speeds at which the upshifts occur are higher when the engine is operating at an advanced throttle setting than when the engine is operating at a lesser throttle setting.

The valve land 640 of the manual lock down valve is adapted to block off the throttle modulated pressure from the governor valve upon movement thereof to the left. All of the shifts will then occur at the closed throttle speed. Valve land 640 is also adapted to selectively restrict certain ones of the passages 572 to supplement the function of the progressive jets 562. If, for example, a passage 572 associated with the progressive jet for a given speed range is uncovered, the upshift and downshift into and out of that speed range will occur at an engine speed which is greater than the engine speed at which that shift would occur while operating at full throttle. However, this latter speed is still below the maximum safe speed of the engine. The manual lock down valve thus allows for maximum engine braking and it also prevents the transmission from being held in one speed range, which would subject the engine to unsafe speeds.

Steering Clutch and Brake Controls

Referring next to FIGURES 5, 6, and 7, we have schematically illustrated the component elements of the previously mentioned servo mechanism 398. A cast valve body is designated by numeral 674 and a working cylinder is formed therein as shown at 676. A piston member 678 is slidably disposed in cylinder 676 and is carried by and secured to the aforementioned piston rod 390. The cylinder 676 is partly defined by an end closure member 680 retained at the upper end thereof, as viewed in FIGURES 5, 6, or 7, by a suitable snap ring 682. The other axial end of cylinder 676 is defined by a transverse partition wall 684 through which the piston rod 390 is slidably disposed. An annular space 686 is formed about the lower portion of the piston rod 390 and is partly defined by the aforementioned wall 684 and an end wall 688, the piston rod 390 extending through wall 688 to the exterior of the cast valve body 674.

The piston rod 390 comprises an external cylindrical portion 690 which may be slidably received through the walls 684 and 688 as above described. The aforementioned sleeve 422 is threadably secured to the external cylindrical portion 690 as shown at 692. A valve insert 694 is received within the cylindrical portion 690 of piston rod 390 and formed with a central, axially extending bore or opening 696. The opening 696 is provided with several axially spaced annular valve lands shown at 698, 700, 702, 704, and 706. A spool valve element 708 is slidably disposed within the opening 696 in valve insert 694 and it is provided with a plurality of valve lands 710, 712, 714, and 716 which are adapted to cooperate with the above-described valve lands for the valve insert 694. An exhaust chamber 718 is formed in the lower portion of the piston structure 390 below the valve insert 694 as shown. The valve element 708 is centered by means of a spring 720 and a spring 722, the former urging the valve element 708 in an upward direction, as viewed in FIGURES 5, 6, or 7 and the latter urging the valve element 708 in a downward direction. A port 723 is formed in valve element 694 and piston rod portion 690 for providing communication between annular chamber 686 and the annular space between valve lands 702 and 704.

A fluid passage is formed at 724 between the cylindrical piston rod portion 690 and the valve insert 694 and it interconnects the fluid working chamber above the piston member 678 with the annular space defined by the adjacent valve lands 700 and 702 formed in the valve insert 694. Similarly, a passage is formed at 726 in the piston rod 390 which provides communication between the working chamber below the piston member 678 and the annular space defined by the adjacent valve lands 704 and 706.

An axially extending drain passage is formed in valve element 708, as shown at 727, and it extends from the drain chamber 718 to a port located in the valve element 708 between the valve lands 710 and 712. A port 729 is formed in valve insert 694 to provide communication between the valve chamber occupied by spring 722 and the working chamber below the piston member 678.

A clutch relay valve chamber is formed in valve body 674, as shown at 728 and it is provided with a plurality of axially spaced, annular, valve lands shown at 730, 732, 734, 735, 736, 738, and 740. The above-mentioned clutch relay valve element 408 is slidably disposed within the valve chamber 728 and it is also provided with annular spaced valve lands as shown at 744, 746, 748, and 750. As previously mentioned, valve element 408 is positively connected to shaft 386 through a linkage mechanism which includes link element 412 and extension 410. An exhaust passage is formed in the valve element 408, as shown at 752, and it provides communication between a port formed in valve land 746 and the exterior surface. The annular space 686 is in fluid communication with the annular space between valve lands 735 and 736 through a port 753.

A third cylindrical valve chamber is formed in the valve body 674, as shown at 754, and it slidably receives a coolant oil valve element 756 having two spaced valve lands 758 and 760 formed thereon. The valve element 756 is normally biased in a downward direction, as viewed in FIGURES 5, 6, and 7 by a spring 762.

A coolant oil passage 764 extends from an intermediate location on the valve chamber 754 to the multiple disc steering brake 324, 326 and another passage 766 extends from a coolant oil pump 768 to the valve chamber 754 at a location adjacent the passage 764.

A fluid passage is shown in FIGURES 5, 6, and 7 extending from the steering clutch servo to the annular space defined by the valve lands 736 and 738 in the valve chamber 730 for the purpose of conducting fluid pressure to the clutch servo to energize the same. This passage was previously shown in FIGURE 2 by means of numerals 266, 264, 268, and 270, and it will be designated in the schematic drawing of FIGURES 5, 6, and 7 by the single numeral 266.

Another fluid passage is formed at 770 to provide communication between the space below valve element 756 and the annular space between valve lands 734 and 735.

It will be apparent that the above-described valve structure is associated with the steering clutch and brake assembly located at one side of the above-described transmission mechanism. The valve structure for the servo mechanism associated with steering clutch and brake assembly at the other side of the transmission is identical to that above described. In FIGURES 5, 6, and 7, the valve and servo structure located on the left side of the figure is associated with one steering clutch and brake assembly, and the valve and servo structure located on the right side of the figure is associated with the other steering clutch and brake assembly. Similar elements in each of the valve and servo structure are identified by identical numerals.

A plurality of crossover passages are shown in FIGURE 5, 6, and 7 at 772, 774, 776, and 778. A main pressure supply pump is shown schematically at 780 in passage 774. It will be apparent from an inspection of FIGURES 5, 6, and 7 that crossover passage 772 interconnects the space between valve lands 738 and 740 in valve chamber 730 of the left hand structure with the corresponding chamber in the right hand structure. Also pressure supply passage 774 interconnects the annular space between valve lands 735 and 736 in the clutch relay valve of the left hand structure with the corresponding annular space in the right hand structure. The passage 776 interconnects the annular space between valve lands 732 and 734 in the clutch relay valve of the left hand structure with the annular space between valve lands 734 and 735 in the clutch relay valve of the right hand structure. The passage 778 interconnects the annular space between valve lands 735 and 734 in the clutch relay valve of the left hand structure with the annular space between valve lands 732 and 734 in the clutch relay valve of the right hand structure.

Referring first to the structure located at the left hand side of FIGURE 5, the vehicle operator may apply a turning effort to the steering shaft 386 in a clockwise direction, thereby causing shaft 420 to move inwardly with respect to its surrounding sleeve 422. This is made possible by virtue of the lost motion spline connection between shaft 386 and arms 388 and 382 whereas the shaft 420 is positively connected to shaft 386 with no free play therebetween. This slight relative movement between shaft 420 and sleeve 422 compresses spring 720 and shifts valve element 708 in an upward direction. This valve motion will permit high pressure fluid to be transmitted from pump 780 through passage 774, through the annular space between clutch relay valve lands 735 and 736, through port 753, through annular space 686, through port 723, through the space between valve lands 704 and 714, through passage 726 and then into the working chamber located below the piston member 678. Simultaneously, fluid will be exhausted from the space above piston member 678 through passage 724, through the space between the valve lands 700 and 712, through drain passage 727 and finally into drain chamber 718.

The pressure exerted below the piston member 678 will cause the same to move upwardly so that it will tend to follow the movement of the valve element 708. A continued manual effort applied to shaft 386 will be accompanied by a continued power assist from the servo mechanism to effect a desired braking force on the brake actuator ring 334, it being understood that the linkage element 378 is adapted to transmit this braking effort to the outside ring 334 as previously described.

As the shaft 386 is rotated in a clockwise direction, as viewed in the left hand portion of FIGURE 5, the clutch relay valve element 408 is moved upwardly thereby allowing the steering clutch servo to exhaust through passage 226, through the space between clutch relay valve lands 738 and 750, through crossover passage 772, through the space between valve lands 740 and 750 of the clutch relay valve for the right hand valve structure shown in FIGURES 5, 6, and 7, and then into the sump. Further, as the clutch relay valve element 408 of the left hand structure of FIGURES 5, 6, or 7 is moved upwardly, high pressure fluid is allowed to pass from passage 774 through the space between valve lands 746 and 735, through passage 770 and then into chamber 754 below coolant valve element 756. The valve element 756 then moves upwardly which allows coolant fluid to pass from coolant pump 768 through passage 766, through the space between coolant valve lands 758 and 760, through passage 764 and finally through the brake discs 324, 326.

Referring next to the structure located at the right hand side of FIGURE 5, it is seen that the brake actuator shaft 386 is in an inoperative position. The high pressure fluid in annular space 686 is prevented from entering the working cylinder below piston member 678 by the valve element 708. Likewise, the clutch relay valve shown at the right side of the FIGURE 5 prevents high pressure fluid from entering the chamber below the coolant valve element. However, high pressure fluid is allowed to pass from passage 774 through the annular space between clutch relay valve lands 746 and 748, through passage 266 and then into the steering clutch servo thereby energizing the steering clutch 284, 286 shown at the right side of FIGURE 5.

It may be observed from an inspection of the left hand side of FIGURE 5 that the port 729 located in the piston rod 390 is effective cause the fluid pressure acting within the working chamber below piston member 678 to act against valve element 708 and to bias the latter in a downward direction. Therefore, as the servo working pressure builds up to a progressively greater value, the force required to displace the valve element 708 in an upward direction becomes progressively greater. Accordingly, the vehicle operator must exert a progressively increasing braking effort on steering shaft 386 to keep the braking servo energized. Thus, the manual braking effort required by the vehicle operator is proportional to the magnitude of the braking requirements. This feature is referred to as a "pressure feel back" and it enables the vehicle operator to have a "sense or feel of the road." This is an added safety feature since it enables the vehicle operator to maintain complete control of the vehicle during turning maneuvers.

It is thus seen that the portion of the servo steering control elements assume the positions shown in FIGURE 5 during a turning maneuver in one direction. Power is delivered to one transmission power output driving wheel or sprocket while the other driving wheel sprocket is braked.

Referring next to FIGURE 6, the elements of the servo mechanism at the left hand side of the figure assume the same position as those shown on the right, and the vehicle is adapted for "straight ahead" driving. It will be observed that both of the steering brake shafts 386 are in the fully retracted position and that no high pressure fluid is allowed to pass from the high pressure annular spaces 686 into the brake servo working chamber through the servo valve structure.

When the brake shaft 386 is moved from the position shown in FIGURE 5 to the position shown in FIGURE 6, the clutch relay valve element moves in a downward direction and this allows high pressure fluid to pass from passages 774, through the annular spaces between valve lands 746 and 748, through passages 266 and then to the clutch servo at each side of the figure.

During the movement of the left hand piston and piston rod assembly 678, 390 in a downward direction from the position shown in FIGURE 5 to that shown in FIGURE 6, the high pressure fluid which was present in the working chamber below piston member 678 was exhausted through passage 726 and through the spacing between servo valve lands 706 and 716 into the exhaust chamber 718. Also, in order to facilitate the retraction of the steering brake mechanism, high pressure fluid is caused to pass from the annular space 686 through port 723, through the space between valve lands 702 and 714, through passage 724, and then to the chamber above the piston member 678. It will be understood, of course, that the valve element 708 leads the piston structure during this downward movement by virtue of the above-mentioned lost motion connection between shaft 386 and the arms 388 and 382.

If it is desired to turn the vehicle in the opposite direction, the steering shaft 386 at the right side of FIGURES 5, 6, and 7 may be actuated while the left hand steering shift remains in the retracted position. The mode of operation of the servo mechanism will be similar to that above described. By preference, we have provided a separate brake coolant pump for the structure shown at the right side of these figures, said pump being designated by numeral 768'.

It will be apparent from the foregoing description that the turning radius of the vehicle may be varied as desired by controlling the braking pressure which is applied to the braking discs. If the steering brake is only partially energized, a relative sliding movement between the brake discs will occur. The cooling oil which passes through the brake disc assembly is effective to prevent the slipping brake discs from becoming overheated.

To understand the mode of operation during a vehicle braking operation, reference may be had to FIGURE 7. It may be observed in FIGURE 7 that each of the brake actuator shafts has assumed the fully applied positions. The mode of operation of each of the individual servo mechanisms shown in FIGURE 7 is substantially identical to the mode of operation of the left hand servo mechanism above described with reference to FIGURE 5. However, it will be observed that each of the steering brakes and steering clutches are simultaneously energized whereas the steering clutch shown on the left side of FIGURE 5 is deenergized. The drain passage between the valve lands 740 and 750 at the right side of FIGURE 5 is closed when the right hand brake shaft is actuated, the right hand clutch relay valve element 708 moving in a downward direction as shown. It may be observed that each of the crossover passages 772, 774, 776, and 778 carry full line pressure since all drain openings are closed.

This feature makes it possible to obtain engine braking to supplement the braking effort supplied by the steering brakes. This greatly increases the life of the steering brake and it obviates the need for providing excessively large brake discs.

In the event of a failure in the operation of the above-described vehicle brake boosting mechanism, the brake discs for either of the driving wheels or sprockets may be energized manually by virtue of the lost motion connection between shaft 386 and arms 388 and 382. This feature provides an added margin of safety.

It may be observed from a brief inspection of FIGURE 2 that the steering and brake cooling oil circuit, which was briefly referred to in the above description of the schematic view of FIGURES 5, 6, and 7, comprises a suitable cooling oil inlet passage 782 which communicates with an inwardly extending passage formed in the transmission housing portion 23. Since this passage corresponds to the above-described coolant oil passage 764, it is designated in FIGURE 2 by this numeral. The coolant oil then passes around the inside periphery of a baffle plate 784 and then into the brake discs through a plurality of radially extending openings 786 formed in the peripheral portion 282 of member 254. The oil then passes into an annular groove 788 from which it spills into an oil sump located at the bottom of each of the steering clutch and brake mechanism.

The steering clutch disc may be cooled by the lubricating oil as the lubricating oil passes along the splined end portion of output shaft 16, and then radially outward past end spacer 314. The lubricating oil then passes around the periphery of clutch member 262 and through the clutch discs 284 and 286.

In order to balance the centrifugal pressure produced behind the steering clutch servo piston member 274 during high speed rotation, a lubricating oil passage 792 is provided in hub portion 256 of member 254. This passage 792 is effective to fill the space defined by the back-up plate 278 and the piston member 274. As the clutch assembly rotates about the axis of shaft 16 during operation, the centrifugal pressure in this space will produce a force on the front of piston member 274 which will balance the opposing force produced by the centrifugal pressure behind the piston member 274. The source of this lubricating oil may be seen in FIGURE 1 wherein an axial lubricating oil passage is formed through the center of the input and power shaft 46, said passages being supplied with lubricating oil at a suitable location. The lubricating oil passes from the central opening in shaft 46 through the hub of gear 116, through a passage 794 formed in the web structure 122 and sleeve element 132, through an apertured adaptor 796, through a port 798 in sleeve 154 and along the annular passage defined by the shaft 16 and sleeve 154 to either axial side of the transmission.

Although we have specifically described one preferred embodiment of our invention, we contemplate that various modifications thereof may also be made without departing from the scope of our instant invention as defined by the following claims.

We claim:

1. In a multiple speed transmission for a traction vehicle, a housing, a power output shaft transversely disposed within said housing, driven members rotatably mounted in separate portions of said housing at either end of said power output shaft, said driven members being adapted to be connected to vehicle traction members, separate friction clutch means for clutching each of said driven members to the associated end of said power output shaft, separate friction brake means for braking each of said driven members to said housing portions, each of said brake means being effective to brake the forward and reverse motion of said vehicle and each of said friction clutch means being effective to selectively and individually clutch said driven members to said output shaft, each of said brake means and each of said clutch means having a fluid pressure operated servo including a piston member adapted to transmit an energizing force thereto, a fluid pressure source, conduit structure communicating with said pressure source and including a separate portion extending to each servo, valve means in each of said separate portions of said conduit structure for controlling the distribution of fluid pressure to each servo, and manually operated means for actuating each valve means, a movable portion of each valve means for the clutch and brake means associated with each driven member being operatively connected to separate portions of said manually operated means.

2. In a multiple speed transmission for a vehicle, said vehicle comprising a driving member disposed on either side thereof for propelling the same, a housing, a power output shaft transversely disposed within said housing, separate fluid pressure operated friction clutch means for selectively clutching each driving member to a separate end of said power output shaft, separate personally operable brake means for selectively braking each driving member to said housing, and servo means for providing a powered assist to each of said personnally operable brake means and for energizing the same, a fluid pressure source, conduit structure communicating with said pressure source and including a portion extending to each brake means and each clutch means, a valve means in each of said portions of said conduit structure for controlling the distribution of fluid pressure to said clutch and brake means, each of said personally operable brake means including a control member, a movable portion of each of the separate valve means for the clutch and brake means associated with one driving member being operatively connected to one control member for conjoint movement and a movable portion of each of the separate valve means for the clutch and brake means associated with the other driving member being operatively connected to the other control member for conjoint movement.

3. In a multiple speed transmission having a housing, a power output shaft, a power output driven member, clutch means for drivably connecting said power output shaft and said driven member, brake means including a first friction member carried by said driven member, a second stationary friction member anchored to said housing adjacent said first friction member, a brake actuator member, manually operable means for adjusting said brake actuator member to energize and to engage said friction members thereby braking said driven member, and a control mechanism for selectively actuating said clutch means, said control mechanism including a fluid pressure operated clutch servo, a fluid pressure source, conduit structure interconnecting said clutch servo and said pressure source, and valve means disposed in and partly defining said conduit structure for selectively pressurizing and exhausting said clutch servo, said valve means including a movable portion mechanically connected to said operable means whereby said clutch means is de-energized when said brake actuator member is adjusted to an energized position.

4. In a multiple speed transmission having a housing, a power output shaft, a power output driven member, clutch means for drivably connecting said power output shaft and said driven member, a brake element positively connected to said driven member including a first friction member carried thereon, a second stationary friction member anchored to said housing adjacent said first friction member, a brake actuator member adapted to apply an axial braking force to said friction members for engaging the same upon movement thereof in one direction, a manually operable brake operating shaft rotatably mounted in a portion of said housing, a braking mechanism connecting said brake operating shaft and said actuator member, a hydraulic servo motor including a movable piston and an attached piston rod, said piston rod being secured to said brake operating shaft, and control means for supplying a controlled fluid pressure to said piston to provide a powered braking assist to supplement the manual braking of said power output shaft.

5. In a multiple speed transmission having a housing, a power output shaft, a power output driven member, clutch means for drivably connecting said power output shaft and said driven member including a servo piston clutch actuating member, brake means including a brake element positively secured to said driven member including first friction members carried thereon, second stationary piston members anchored to said housing adjacent said first friction members, a brake actuator member adapted to apply an axial braking force to said friction members for engaging the same upon movement thereof in one direction, a manually operable brake operating shaft rotatably mounted in a portion of said housing, a linkage mechanism connecting said brake operating shaft and said actuator member, control means for selectively energizing said brake means comprising a servo piston and piston rod, a lost motion connection between said piston rod and said brake operating shaft, a cylindrical chamber adapted to receive said piston and piston rod, a fluid pressure source, a valve chamber formed within said piston rod, a fluid pressure conduit extending from said fluid pressure source to said valve chamber, branch passages extending from said valve chamber to either side of said movable piston, and a movable valve element slidably disposed in said valve chamber for selectively controlling the distribution of fluid pressure to either side of said piston.

6. The combination as set forth in claim 5 wherein said control means further includes a valve actuating lever mechanism having one portion positively connected to said brake operating shaft and another portion axially aligned with and movable relative to said piston rod, said movable valve element being resiliently connected with said other portion of the lever mechanism.

7. The combination as set forth in claim 6 wherein said valve chamber and said movable valve element include mating valve lands for selectively controlling the distribution of fluid pressure from said fluid pressure conduit to either of said branch passages, and spring means disposed on either axial end of said valve element for biasing the same to a central position, one of said spring means being seated upon said other portion of the lever mechanism.

8. The combination as set forth in claim 7 wherein said valve element is movable in one axial direction upon movement of said brake operating lever toward a brake operating position and in the other axial direction upon movement of said brake operating lever toward a brake releasing position, said valve element being adapted to cause fluid pressure to be distributed to one side of said piston to produce a braking force upon movement of said valve element relative to said piston rod in a first axial direction and to cause fluid pressure to be distributed to the other side of said piston upon movement of said valve element relative to said piston rod in the other axial direction, and an auxiliary passage interconnecting the valve chamber at one end of said valve element with said cylindrical chamber on said one side of said piston to produce a fluid pressure reaction upon said valve element, said fluid pressure reaction being accompanied by a resistance to manual movement of said brake operating shaft which is proportional to the braking effort applied to said brake means.

9. In a multiple speed power transmission having a power output shaft, a power output driven member mounted at either axial end of said power output shaft, brake means at either axial end of said power output shaft for braking said driven members, clutch means at either axial end of said power output shaft for drivably connecting said power output shaft with either of said driven members, said clutch means comprising engageable clutch surfaces carried by said power output shaft and by said driven member; separate control mechanisms for controlling the operation of each of said clutch and brake means including a fluid pressure source, separate clutch servo mechanisms for engaging the clutch surface associated with each of the associated separate control mechanisms, a brake servo mechanism for energizing said brake means associated with the associated separate control mechanism comprising a working cylinder and a movable piston disposed therein, a piston rod secured to said piston, a manually operable brake shaft, means for connecting said brake shaft with said brake means for transmitting a braking effort to the latter, a first linkage mechanism operatively connecting said brake shaft with said piston rod, one portion of said linkage mechanism being joined to said brake shaft with a lost motion connection, another portion of said first linkage mechanism being joined to said piston rod, a second linkage mechanism having one portion thereof positively secured to said brake shaft and another portion slidably associated with respect to said piston rod, a valve chamber formed in said piston rod, passage means for conducting hydraulic pressure from said source to said valve chamber, branch passage means extending from said valve chamber to either side of said piston, a movable control valve element disposed in said valve chamber for distributing hydraulic pressure to either side of said piston upon movement thereof relative to said piston in either axial direction, spring means disposed on either side of said valve element for centering the same, the spring means at one end of said valve element being seated on said other portion of said second linkage mechanism and movable thereby upon movement of said brake shaft, and means for transferring fluid pressure from said working cylinder at one side of said piston to said valve chamber at said one end of said valve element to provide a reaction to manual operation of said brake shaft which is proportional to the braking effort.

10. The combination as set forth in claim 9 wherein said control mechanism includes other passage means interconnecting said source of hydraulic pressure with each of said clutch servo mechanisms, another valve chamber forming a portion of said other passage means, a second movable valve element disposed in said other valve chamber, said second movable valve element being connected to and movable with said brake shaft, fluid exhaust chambers communicating with said other valve chambers, said second movable valve element and said other valve chamber having cooperating valve lands for selectively exhausting the associated clutch servo mechanism upon movement of said brake shaft toward a brake operating position and for distributing hydraulic pressure to the same upon movement of said brake shaft toward a brake releasing position.

11. The combination as set forth in claim 10 wherein said control mechanism further includes a third valve chamber, a cooling oil distributing valve slidably disposed in said third valve chamber, auxiliary passage means interconnecting said second and said third valve chambers for delivering fluid pressure to said third valve chamber on one side of said cooling oil distributing valve when said second movable valve element is moved to a brake operating position, a source of cooling oil pressure, cooling oil passage means extending from said cooling oil pressure source to one of the brake means, said third valve chamber forming a portion of said cooling oil passage means, said cooling oil distributing valve being adapted to block said cooling oil passage when the associated brake means is released and to open the same when the associated brake means is energized.

12. The combination as set forth in claim 11 wherein a plurality of passage means interconnect the separate control mechanisms and wherein the communication between the exhaust chamber and one clutch servo mechanism is controlled by the second valve element of the control mechanism associated with the other clutch servo mechanism, and the communication between the exhaust chamber and said other clutch servo mechanism is controlled by a second valve element of the control mechanism associated with said one clutch servo mechanism.

13. The combination as set forth in claim 12 wherein the communication between both of said clutch servo mechanisms and said exhaust chamber is blocked when both brake means are simultaneously energized.

14. In a multiple speed transmission having a housing, a power output shaft, and a driven member rotatably mounted in a portion of said housing adjacent each end of said power output shaft; fluid pressure operated clutch means for drivably connecting each end of said power output shaft to separate ones of said driven members, and brake means for braking said driven members to said housing, each of said brake means comprising first friction means drivably carried by said driven member, other stationary friction means anchored to said housing adjacent said first friction means, an actuator member disposed adjacent one of said friction means, and a cam mechanism disposed adjacent said actuator member, said cam mechanism being adapted to shift said actuator member to energize said brake means upon movement thereof relative to said housing, said brake means including a manually operated member and a servo motor having a pressure operated member mechanically connected to said manually operated member, a mechanical connection between said cam mechanism and said manually operated member, a fluid pressure source, conduit structure communicating with said pressure source and including separate portions extending to said clutch means and to said servo motor, separate valve means disposed in and partly defining each of said portions of said conduit structure for controlling the distribution of fluid pressure to said clutch and brake means, and a mechanical connection between movable portions of each valve means and said manually operated member for conjoint movement thereof.

15. In a multiple speed transmission having a housing, a power output shaft, and a separate driven member rotatably mounted in a portion of said housing adjacent each end of said housing adjacent each end of said power output shaft; first pressure operated clutch means for drivably connecting each end of said power output shaft to separate ones of said driven members, and separate brake means for braking each of said driven members to said housing, each brake means comprising first friction portions carried by the associated driven member and separate relatively stationary friction portions anchored to said housing adjacent said first friction portions, an actuator member disposed near said adjacent friction portions, and manually operable linkage means for moving said actuator member into engagement with said friction portions to energize the latter, each brake means including a servo motor having a pressure operated portion connected to said linkage means to provide a powered assist, a fluid pressure source, conduit structure communicating with said pressure source and including separate portions extending to each clutch means and to each servo motor, separate valve means situated in and defining in part each portion of said conduit structure, and a mechanical connection between said linkage means and a movable portion of each valve means for conjointly controlling the clutch and brake means for each of the respective driven members.

16. In a multiple speed transmission having a housing, a power output shaft, and a driven member rotatably mounted in a portion of said housing adjacent each end of said housing adjacent each end of said power output shaft; clutch means for drivably connecting each end of said power outuput shaft to separate ones of said driven members, brake means for braking said driven members to said housing, said brake means comprising first friction portions carried by each of said driven members and separate relatively stationary friction portions anchored to said housing adjacent said first friction portions, an actuator member disposed near said adjacent friction portions, manually operable linkage means for moving said actuator into engagement with said friction portions to energize the latter, and power boosting means for supplementing the manual braking effort comprising a hydraulic cylinder, a piston slidably disposed in said cylinder and operatively connected to a portion of said manually operable linkage means, conduit means for conducting fluid pressure to said cylinder, and valve means in said conduit means having portions operatively connected to said manually operable linkage means for selectively distributing fluid pressure to said hydraulic cylinder.

17. In a multiple speed transmission having a housing, a power output shaft, and a driven member rotatably mounted in a portion of said housing adjacent each end of said power output shaft; hydraulic clutch means for drivably connecting each end of said power output shaft to separate ones of said driven members, brake means for braking said driven members to said housing, said brake means comprising friction portions carried by each of said driven members and relatively stationary friction portions secured to adjacent portions of said housing, a brake actuator member disposed adjacent said friction portions for urging the same into frictional engagement, a brake operating member, linkage means operatively connecting said brake operating member and said brake actuator member, a hydraulic servo having a movable portion coupled to said brake operating member with a lost motion connection, conduit means for delivering hydraulic pressure to said servo, and valve means in said conduit means having a portion positively connected to said brake operating member for alternately distributing hydraulic pressure to opposed sides of said movable servo portion upon movement of said brake operating member into and out of a brake energizing position.

18. In a multiple speed transmission having a power output shaft, a driven member disposed at each end of said output shaft, separate clutch means for drivably connecting said output shaft with each of said driven members, and separate brake means for individually braking each of said driven members to a stationary portion of said transmission, said brake means including engageable friction members carried by each of said driven members and by adjacent stationary portions of said transmission, and said clutch means including engageable friction members carried by each of said driven members and by said power output shaft; mechanical means including a brake operating member for frictionally engaging the friction members for each brake means, a pressure responsive member for urging the clutch friction members for each clutch means into engagement, a power boosting mechanism associated with each driven member including a cylinder and a piston member slidably disposed in said cylinder, each brake means being joined to its associated brake operating member with a lost motion connection, conduit structure for delivering fluid pressure to said power boosting mechanism and said clutch means, a first and a second movable valve element disposed in separate portions of said conduit structure and connected to said brake operating member, said first valve element being adapted to selectively distribute fluid pressure to either side of said piston member and said second valve member being adapted to distribute fluid pressure to said pressure responsive member upon movement of said brake operating member.

19. In a multiple speed transmission having a power output shaft, a driven member disposed at each end of said output shaft, separate clutch means for drivably connecting said output shaft with each of said driven members, and separate brake means for individually braking each of said driven members to a stationary portion of said transmission; a brake operating shaft associated with each brake means and forming a portion of the same, a power boosting mechanism for each brake means comprising a cylinder, a piston member, a lost motion connection between said piston member and the associated brake operating shaft, conduit means for delivering fluid pressure to each of said power boosting mechanisms, a first movable valve element disposed in said conduit means and within the piston member for each power boosting mechanism, said valve elements being adapted to be actuated by their associated brake operating shaft to selectively distribute fluid pressure to either side of said piston member, a second movable valve element for each clutch means disposed in separate portions of said conduit means for distributing pressure to the associated clutch means for energizing the latter, each of said second movable valve elements being positively connected to the associated brake operating shaft, the valve elements associated with one brake operating shaft being adapted to energize the power boosting mechanism for one brake means while simultaneously deenergizing the associated clutch means upon being moved by their brake operating shaft.

20. In a multiple speed transmission, a power output shaft, a first driven member disposed adjacent one end of said shaft, a second driven member disposed adjacent the other end of said shaft, a first and a second brake means for respectively braking said first and said second driven members to stationary portions of said transmission, a first and a second clutch means for respectively clutching said shaft to said first and second driven members, separate mechanical linkage means for energizing each of said brake means, a hydraulic power boosting mechanism for each brake means including a cylinder and a movable piston member disposed thereon, a lost motion connection between each of said piston members and a portion of its associated linkage means, conduit means for delivering fluid pressure to said cylinder and to said clutch means, first and second valve elements disposed in said conduit means and connected to a portion of one of said linkage means, third and fourth valve elements disposed in said conduit means and connected to a portion of the other of said linkage means, said first valve element being adapted to distribute fluid pressure to one side of the piston member for said first brake means and said third valve element being adapted to distribute fluid pressure to said second clutch means when said portion of the one linkage means is moved toward a brake operating position while the said portion of the other linkage means assumes a brake retracting position.

21. The combination as set forth in claim 20 wherein said valve elements are adapted to distribute fluid to each of said clutch means and each of said power boosting mechanisms upon simultaneous movement of each of said linkage means toward a brake operating position.

22. In a multiple speed transmission having a housing, a power output shaft, a power output driven member, clutch means for drivably connecting said power output shaft and said driven member, brake means including a first friction member carried by said driven member, a second friction member anchored to said housing adjacent said first friction member, a brake actuator member, manually operable means for adjusting said brake actuator member to energize and to engage said friction members thereby braking said driven member, a control mechanism for selectively actuating said clutch means, said brake means comprising an annular brake actuator ring disposed about the axis of said power output shaft, said brake actuator ring being rotatably and axially movable within said housing, a cam ring disposed adjacent said brake actuator ring, cam elements disposed between said brake actuator ring and said cam ring for separating the same upon rotation of said brake actuator ring about said axis, a manually operable brake operating shaft mounted in a portion of said housing, and a linkage mechanism interconnecting said brake actuator ring and said brake operating shaft for rotating the former to produce an axial thrust upon said friction members to frictionally engage the same.

23. The combination as set forth in claim 22 wherein said brake means further includes a thrust ring interposed between said cam ring and said friction members, and thrust bearing members interposed between said cam ring and said thrust ring, said bearing members comprising spherical elements and relieved bearing race surfaces formed on said cam ring and said thrust ring for receiving said spherical elements.

References Cited in the file of this patent

UNITED STATES PATENTS

| | | |
|---|---|---|
| 2,158,935 | Gustafson | May 16, 1939 |
| 2,496,429 | Baker et al. | Feb. 7, 1950 |
| 2,564,999 | Scheuerman | Aug. 21, 1951 |
| 2,641,343 | Bennett | June 9, 1953 |
| 2,669,330 | Banker | Feb. 16, 1954 |
| 2,712,370 | Westfall | July 5, 1955 |
| 2,786,560 | Ishoy | Mar. 26, 1957 |
| 2,883,019 | Kershner et al. | Apr. 21, 1959 |
| 2,885,043 | Martinson | May 5, 1959 |